(12) United States Patent
Kagami et al.

(10) Patent No.: US 10,196,104 B1
(45) Date of Patent: Feb. 5, 2019

(54) TERRAIN EVALUATION FOR ROBOT LOCOMOTION

(71) Applicant: Schaft Inc., Tokyo (JP)

(72) Inventors: Satoshi Kagami, Tokyo (JP); Koichi Nishiwaki, Tokyo (JP)

(73) Assignee: Schaft Inc., Tokyo (JP)

( * ) Notice: Subject to any disclaimer, the term of this patent is extended or adjusted under 35 U.S.C. 154(b) by 192 days.

(21) Appl. No.: 15/361,465

(22) Filed: Nov. 27, 2016

Related U.S. Application Data

(60) Provisional application No. 62/331,663, filed on May 4, 2016.

(51) Int. Cl.
| | |
|---|---|
| *B25J 9/16* | (2006.01) |
| *B62D 57/032* | (2006.01) |
| *B25J 13/08* | (2006.01) |

(52) U.S. Cl.
CPC .......... *B62D 57/032* (2013.01); *B25J 9/1666* (2013.01); *B25J 13/08* (2013.01)

(58) Field of Classification Search
CPC ..... B62D 57/032; G06Q 10/047; B25J 13/08; B25J 9/1666; B25J 9/1664; G01C 21/3446; G01C 21/3461; G01C 21/3453; G01C 21/00; G01C 21/20; G01C 21/3407; G05D 1/021; G05D 1/0214; G05D 1/0217; G05D 1/0231; G05D 1/0238; G05D 1/024; G05D 1/0246; G05D 1/0248; G05D 1/0251; G05D 1/00; G05D 1/0088
See application file for complete search history.

(56) References Cited

U.S. PATENT DOCUMENTS

| | | |
|---|---|---|
| 7,386,163 B2 | 6/2008 | Sabe et al. |
| 7,865,267 B2 | 1/2011 | Sabe et al. |
| 7,912,583 B2 | 3/2011 | Gutmann et al. |
| 8,311,676 B2 | 11/2012 | Shih |
| 8,781,217 B2 | 7/2014 | Gurman et al. |

(Continued)

OTHER PUBLICATIONS

Okada et al., Walking Navigation System of Humanoid Robot using Stereo Vision based Floor Recognition and Path Planning with Multi-Layered Body Image, Proceedings of the 2003 IEEE/RSJ, International Conference on Intelligent Robots and Systems, Oct. 2003.

(Continued)

*Primary Examiner* — Adam R Mott
(74) *Attorney, Agent, or Firm* — Honigman Miller Schwartz and Cohn LLP

(57) ABSTRACT

An example method includes determining a plurality of candidate support regions for a support member of a robotic device. The method also includes determining a support region score (SRS) for each candidate support region, wherein the SRS for a given candidate support region depends on a surface geometry of the given candidate support region. The method additionally includes determining an adjacent relation scores (ARS) for each candidate support region, wherein the ARS for a particular candidate support region is based at least on a plurality of SRSs of a plurality of support regions surrounding the particular candidate support region. Based on the determined SRSs and the determined ARSs, the method further includes selecting at least one support region from the plurality of candidate support regions and providing instructions for the robotic device to place the support member on the at least one selected support region.

19 Claims, 16 Drawing Sheets

(56) References Cited

U.S. PATENT DOCUMENTS

2005/0065650 A1     3/2005   Lewis
2010/0324769 A1    12/2010   Takaoka

OTHER PUBLICATIONS

Kagami et al., Online 3D Vision, Motion Planning and Bipedal Locomotion Control Coupling System of Humanoid Robot : H7, Proceedings of the 2002 IEEE/RSJ, International Conference on Intelligent Robots and Systems, Oct. 2002.

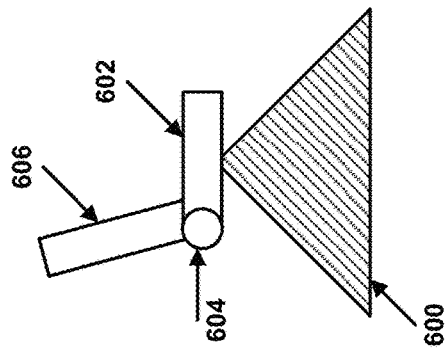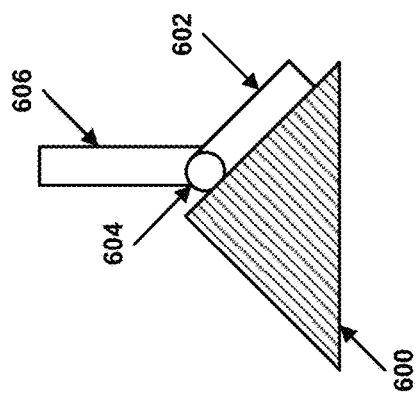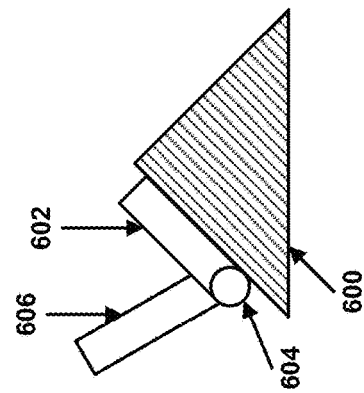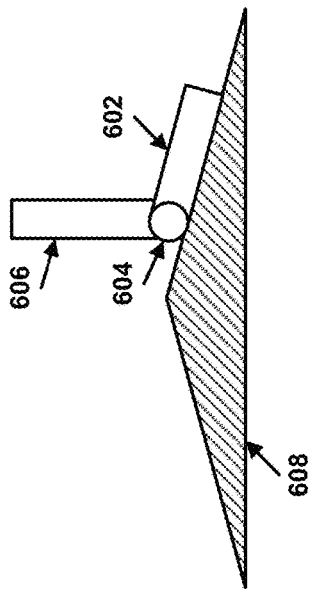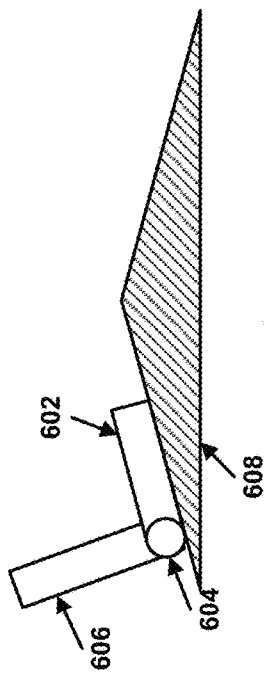

| 900 | 901 | 902 | 903 |
|---|---|---|---|
| SRS: 0.9 | SRS: 0.6 | SRS: 0.5 | SRS: 0.1 |
| ARS: 0.4 | ARS: 0.56 | ARS: 0.5 | ARS: 0.73 |
| Total: 0.65 | Total: 0.58 | Total: 0.5 | Total: 0.42 |
| 904 | 905 | 906 | 907 |
| SRS: 0.5 | SRS: 0.1 | SRS: 0.8 | SRS: 0.9 |
| ARS: 0.62 | ARS: 0.675 | ARS: 0.563 | ARS: 0.58 |
| Total: 0.56 | Total: 0.3 | Total: 0.388 | Total: 0.74 |
| 908 | 909 | 910 | 911 |
| SRS: 0.7 | SRS: 0.8 | SRS: 0.6 | SRS: 0.9 |
| ARS: 0.4 | ARS: 0.513 | ARS: 0.713 | ARS: 0.82 |
| Total: 0.55 | Total: 0.66 | Total: 0.66 | Total: 0.86 |
| 912 | 913 | 914 | 915 |
| SRS: 0.2 | SRS: 0.4 | SRS: 0.8 | SRS: 1.0 |
| ARS: 0.63 | ARS: 0.62 | ARS: 0.74 | ARS: 0.76 |
| Total: 0.415 | Total: 0.51 | Total: 0.77 | Total: 0.88 |

FIG. 9

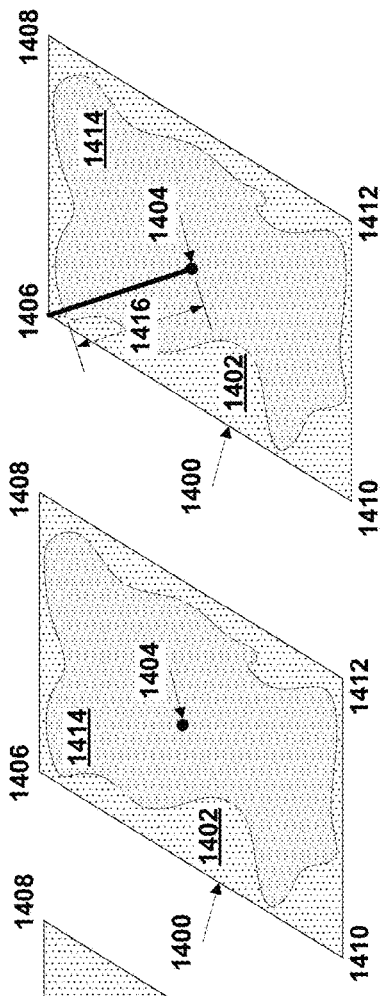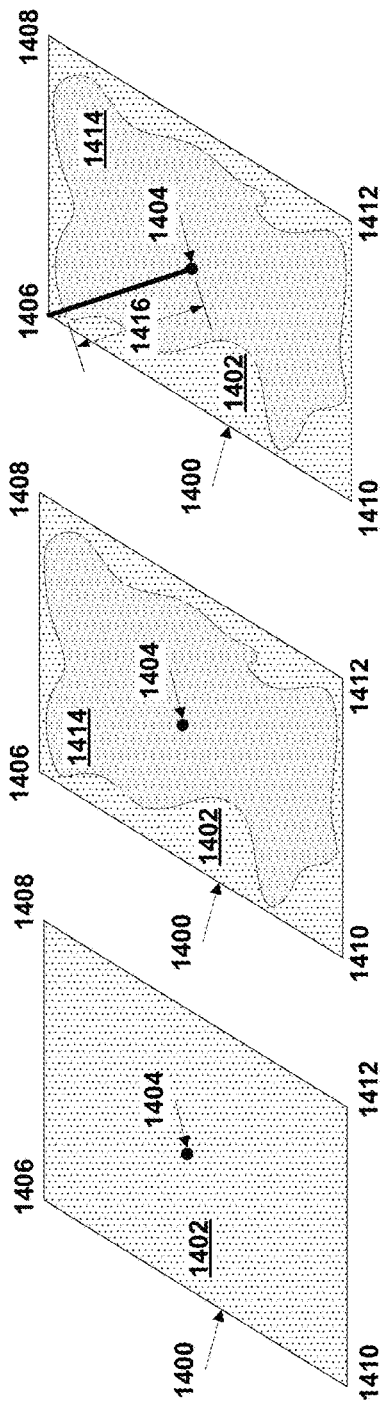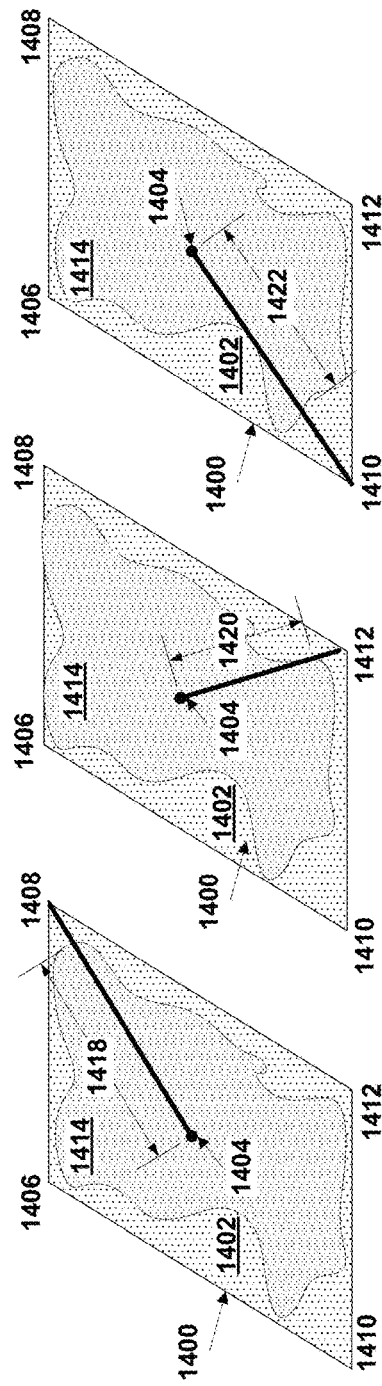

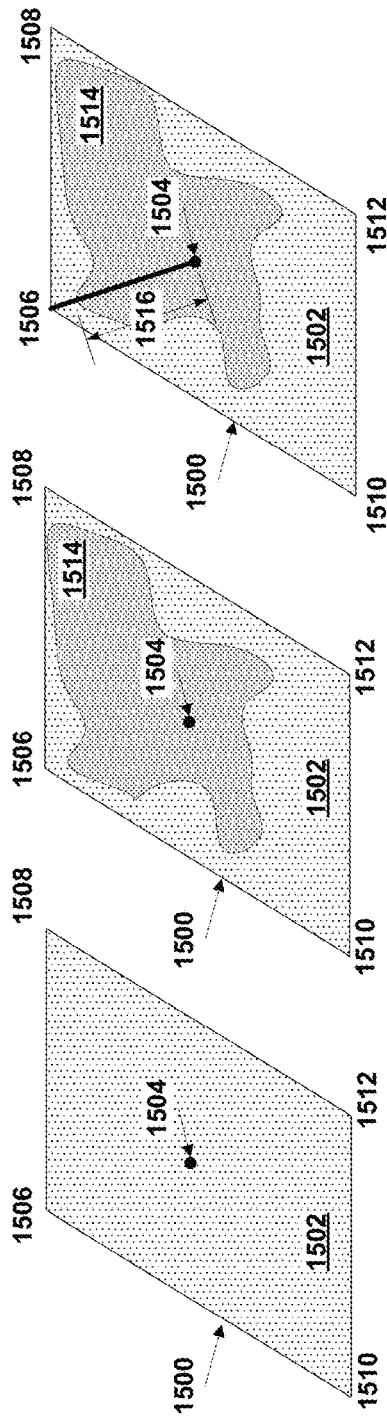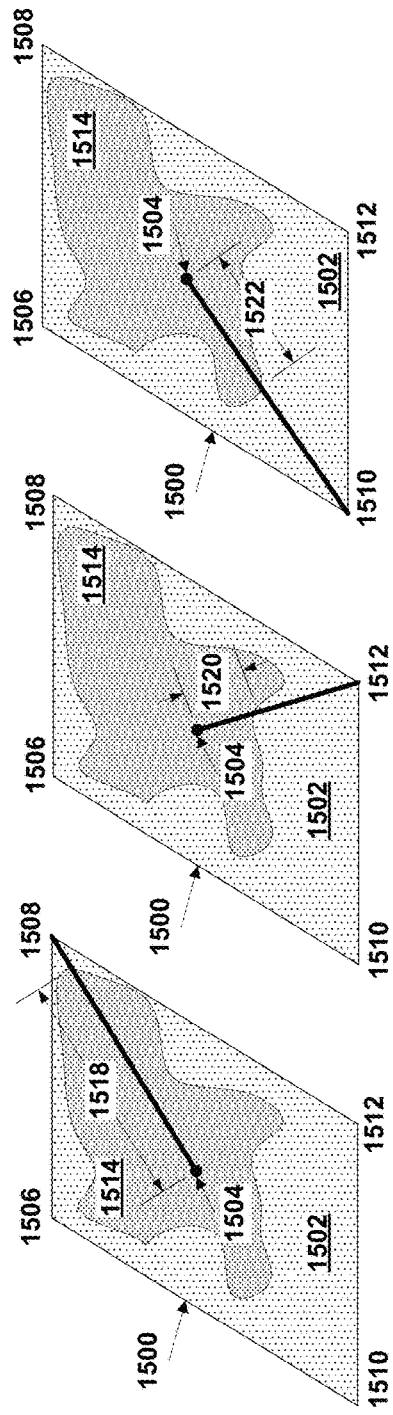
FIG. 15A  FIG. 15B  FIG. 15C
FIG. 15D  FIG. 15E  FIG. 15F

| Region | Pitch Angle | Roll Angle | Max Height | Min Height | Support Region Score |
|--------|-------------|------------|------------|------------|----------------------|
| 1600 | -10° | 7° | 10 cm | 5 cm | .5 |
| 1602 | 10° | 18° | 8cm | 6 cm | .4 |
| 1604 | 4° | 14° | 12 cm | 2 cm | .6 |
| 1606 | 6° | 2° | 6cm | 0 cm | .1 |
| 1608 | 1° | 5° | 5cm | -2 cm | .9 |
| 1610 | 15° | 7° | 0cm | -8 cm | .8 |
| 1612 | 6° | 11° | 4cm | -1 cm | .2 |
| 1614 | 13° | 13° | 2cm | 2 cm | .7 |
| 1616 | 14° | 4° | 1cm | -7 cm | .9 |

TERRAIN EVALUATION FOR ROBOT LOCOMOTION

CROSS REFERENCE TO RELATED APPLICATION

The present application claims priority to U.S. Provisional patent application Ser. No. 62/331,663, filed on May 4, 2016, and entitled "Terrain Evaluation for Robot Locomotion," which is herein incorporated by reference as if fully set forth in this description.

BACKGROUND

A concern in designing robotic devices capable of locomotion is keeping the devices stable as they traverse different environments. In the case of some robots, this task may be, at least in part, inherently achieved by designing the robot to have a low center of mass and a large number of support points. As an example, a robot having four wheels and a low center of mass may be capable of traversing uneven terrains without tipping over.

In contrast, many walking robots such as bipeds modeled after humans and quadrupeds modeled after animals may have high centers of mass and an inherently unstable gait. For such robotic devices, effective and efficient locomotion may require some knowledge of the terrain ahead. Terrains that contain obstacles and uneven surfaces may cause such robots to tip, lose balance, and fall over if these obstacles are not properly identified and accounted for.

SUMMARY

A portion of the environment in which a robot is walking or otherwise moving may be scanned by the robotic device. A virtual representation of the scanned area may be divided into a plurality of candidate support regions. Each candidate support region may be assigned a support region score (SRS) based on the surface geometry (topology of the terrain) of the candidate support region. Each candidate support region may additionally be assigned an adjacent relation score (ARS) based on the surface geometry (topology of the terrain) of the area surrounding the candidate support region. The robotic device may determine where to place a support member of the robotic device based on a combination of the SRS and the ARS.

In one example, a method is provided that includes determining, by one or more processors, a plurality of candidate support regions for a support member of a robotic device based on sensor data received from one or more sensors. The method also includes determining a plurality of support region scores corresponding to the plurality of candidate support regions, wherein the support region score for a given candidate support region depends on a surface geometry of the given candidate support region. The method additionally includes determining a plurality of adjacent relation scores corresponding to the plurality of candidate support regions, wherein the adjacent relation score for a particular candidate support region is based at least on a plurality of support region scores of a plurality of support regions surrounding the particular candidate support region. Based on the determined plurality of support region scores and the determined plurality of adjacent relation scores, the method further includes selecting at least one support region for the support member of the robotic device from the plurality of candidate support regions and providing instructions for the robotic device to place the support member on the at least one selected support region.

In another example, a robotic device is disclosed that includes a plurality of support members, at least one sensor on the robotic device, and control system. The control system is configured to determine a plurality of candidate support regions for at least one of the plurality of support members based on sensor data received from the at least one sensor. The control system is also configured to determine a plurality of support region scores corresponding to the plurality of candidate support regions, wherein the support region score for a given candidate support region depends on a surface geometry of the given candidate support region. The control system is additionally configured to determine a plurality of adjacent relation scores corresponding to the plurality of candidate support regions, wherein the adjacent relation score for a particular candidate support region is based at least on a plurality of support region scores of a plurality of support regions surrounding the particular candidate support region. Based on the determined plurality of support region scores and the determined plurality of adjacent relation scores, the control system is further configured to select at least one support region for the at least one of the plurality of support members from the plurality of candidate support regions and provide instructions for the robotic device to place the at least one of the plurality of support members on the at least one selected support region.

In another example, a non-transitory computer readable medium having stored thereon instructions that, when executed by a computing system, cause the computing system to perform functions is disclosed. The functions include determining a plurality of candidate support regions for a support member of a robotic device based on sensor data received from one or more sensors. The functions also include determining a plurality of support region scores corresponding to the plurality of candidate support regions, wherein the support region score for a given candidate support region depends on a surface geometry of the given candidate support region. The functions additionally include determining a plurality of adjacent relation scores corresponding to the plurality of candidate support regions, wherein the adjacent relation score for a particular candidate support region is based at least on a plurality of support region scores of a plurality of support regions surrounding the particular candidate support region. Based on the determined plurality of support region scores and the determined plurality of adjacent relation scores, the functions further include selecting at least one support region for the support member of the robotic device from the plurality of candidate support regions and providing instructions for the robotic device to place the support member on the at least one selected support region.

In yet another example, a robotic system may include means for determining a plurality of candidate support regions for a support member of a robotic device based on sensor data received from one or more sensors. The robotic system may also include means for determining a plurality of support region scores corresponding to the plurality of candidate support regions, wherein the support region score for a given candidate support region depends on a surface geometry of the given candidate support region. The robotic system may additionally include means for determining a plurality of adjacent relation scores corresponding to the plurality of candidate support regions, wherein the adjacent relation score for a particular candidate support region is based at least on a plurality of support region scores of a plurality of support regions surrounding the particular candidate support region. Based on the determined plurality of support region scores and the determined plurality of adjacent relation scores, the robotic system may further include means for selecting at least one support region for the support member of the robotic device from the plurality of candidate support regions and means for providing instructions for the robotic device to place the support member on the at least one selected support region.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIGS. 6A-6C illustrate an additional support region that is not foot-placeable, according to an example embodiment.

FIGS. 6D-6E illustrate an additional support region that is foot-placeable, according to an example embodiment.

FIG. 9 illustrates a plurality of support regions with assigned scores, according to an example embodiment.

FIGS. 14A-14F illustrate aspects of a process for computing a support region score for a candidate support region, according to an example embodiment.

FIGS. 15A-15F illustrate aspects of a process for computing a support region score for a different candidate support region, according to an example embodiment.

DETAILED DESCRIPTION

Figure 1:
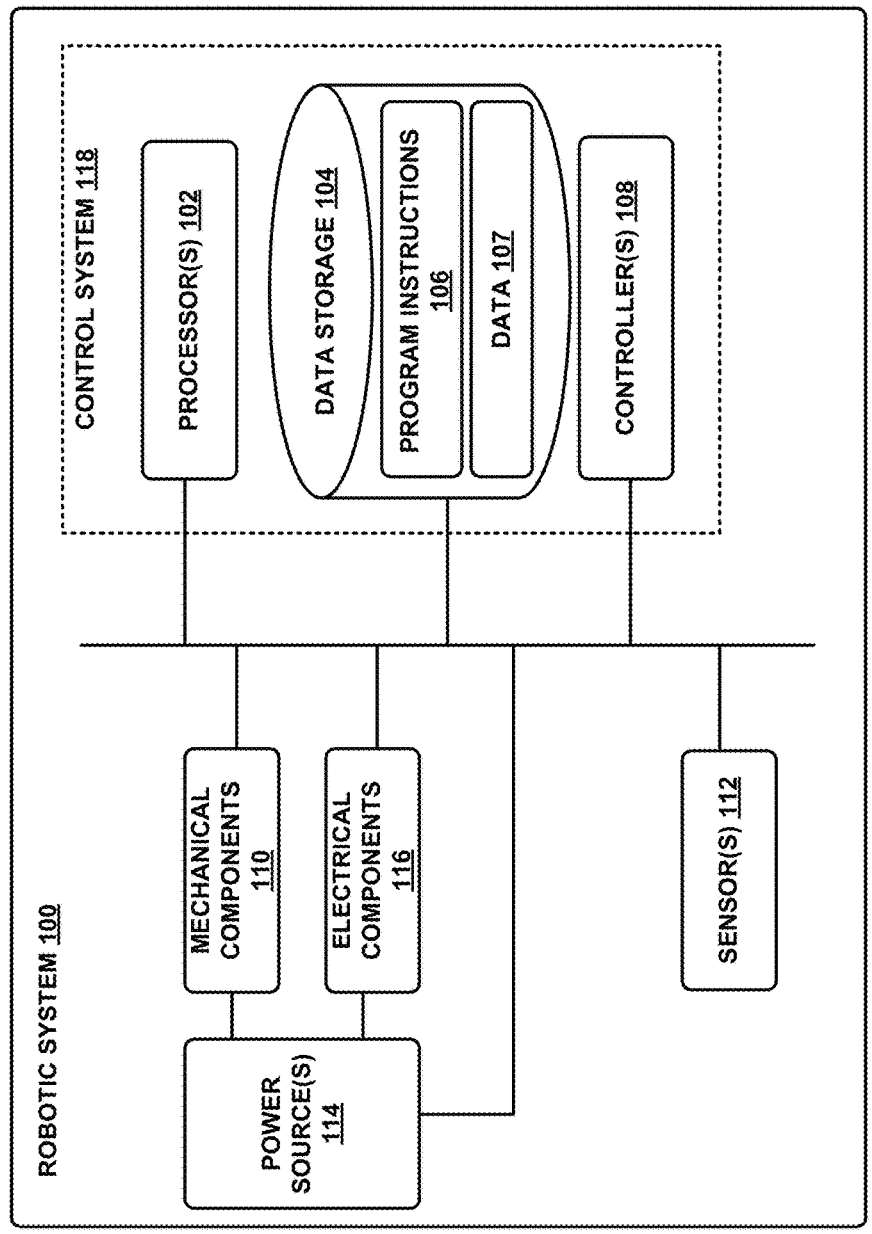
FIG. 1 illustrates a block diagram of a robotic device, according to an example embodiment.

Example embodiments are described herein. The words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. Thus, the aspects of the present disclosure, as generally described herein and illustrated in the figures, can be arranged, substituted, combined, separated, and designed in a wide variety of different configurations, all of which are contemplated herein.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

I. OVERVIEW

Example embodiments describe methods of terrain evaluation for a support member of a mobile robotic device. The support member of the robotic device may be any of a number of different support structures enabling robotic locomotion including, but not limited to, legs, wheels, track, treads, and combinations thereof. The robot may be a human-like biped having two legs, each attached to a foot which may be considered to be the support member. However, the methods described herein may also be applied to robots having only a single support member. In either case, maintaining balance of the robot during locomotion may require some knowledge and analysis of the terrain that the robot is expected to traverse.

In some embodiments, two-dimensional (2D) or three-dimensional (3D) sensors may be used to acquire scans of a nearby environment. The sensors may be located on any part of the robotic device that provides a good point of view of the terrain of interest. For example, in the case of a humanoid walking robot, the sensors may be located in or on the head. The sensors may be controlled to perform a coarse scan of the surrounding environment which may be followed by a detailed scan of a particular area of interest. Terrain evaluation may be carried out on data acquired from the coarse scan as well as data acquired from the detailed scan in order to achieve different levels of accuracy. The total extent of the environment (e.g. total area and/or the shape of the area) captured by the scanning process may depend on the particular choice of sensor as well as the desired granularity and level of detail of the scan.

The terrain evaluation process may comprise dividing the total extent of the environment, or a portion thereof, into a plurality of candidate support regions. In some embodiments, the plurality of candidate support regions may be mutually exclusive while in other embodiments the regions may be overlapping. The candidate support regions may be of different shapes such as, for example, square, rectangular, triangular, circular, or any combination thereof. The candidate support regions may be smaller, larger, or have the same size as the portion of the robotic support member in contact with the ground (e.g. the area of the robotic foot).

Each of the plurality of candidate support regions may be assigned a support region score (SRS) based on the surface geometry of a given candidate support region. The support region score may be dependent on the inclination (e.g. roll angle, pitch angle) of the given candidate support region or portions thereof, the number and size of any holes or depressions in the given candidate support regions, as well as the number and size of any elevations or protrusions in the given candidate support region. Exemplary methods of computing and assigning the support region scores are described herein.

Each of the plurality of candidate support regions may also be assigned an adjacent relation score (ARS) based on the surface geometry of an area surrounding a particular candidate support region. The adjacent relation score may be computed and assigned based on support region scores of a plurality of candidate support regions (or at least portions thereof) surrounding the particular candidate support region. The adjacent relation score may be further based on absolute measures of or differences in inclination (e.g. roll angle, pitch angle), and/or differences in height between a particular candidate support region and the surrounding area. Exemplary methods of computing and assigning the adjacent relation scores are described herein.

Following the terrain evaluation process, a robot may determine a route or path along which to proceed. In the case of a legged robot, the route or path may comprise a series of steps that the legs of the robot may take in order to move in a desired direction. In the case of a wheeled robot or a robot utilizing tracks or treads, a continuous or approximately continuous route or path may be computed for each wheel, track, or tread. The process of selecting a route or path may utilize any combination of the support region score and the adjacent relation score. For example, a composite (total) score may be computed for each of the plurality of candidate support regions. The composite score may be an average of the support region score and the adjacent relation score for the particular support region. A support region or a plurality of support regions may be selected based on a support region or multiple support regions having the highest composite score. Alternatively, a support region, or a plurality thereof, may be selected based on the support region having a SRS above a first threshold and/or an ARS above a second threshold. The selected support regions may be the most stable place on or in which to place the robotic support member.

In example embodiments, the size and shape of the candidate support regions may be chosen based on an area of the support member that is in contact with the ground (e.g. the area of a foot of the robot in the case of a legged robot). In an example embodiment, the support member may comprise a rectangular foot and each of the plurality of candidate support regions may be a size and shape of the rectangular foot. Alternatively, each of the plurality of candidate support regions may be larger or smaller than the foot and may have a shape that is different from the shape of the foot. Determining the route or path may comprise selecting a number of support regions for the support member of the robot such that a total area of the selected support regions is at least as large as the area of the support member that is in contact with the ground. Alternatively, the total area of the selected support regions may be a fraction of the area of the support member that is in contact with the ground. The process of selecting the route or path may additionally be based on a number of different aspects of robot performance such as maintenance of balance and stability, speed of locomotion, power usage, and physical constraints of robotic joints.

The robotic device may subsequently be controlled to place the support member in the selected support region. Exemplary methods may be repeated indefinitely in order to allow a robotic device to proceed in a desired direction. Exemplary methods may allow the robotic device to avoid obstacles or topological features that may cause the robotic device to trip and/or lose balance. The method may also allow the robotic device to select support regions offering the largest degree of lateral support so as to prevent the support member of the robotic device from slipping or sliding off large inclines. The method may additionally allow the robotic device to tolerate inaccuracies and uncertainties present in the robotic device by selecting foot-placeable regions that are surrounded by other foot-placeable regions. Consequently, any inaccuracies such as those of sensor measurement or uncertainties in body motion that may cause the robotic support member to land outside of the selected support region may not be problematic.

II. EXAMPLE ROBOTIC SYSTEMS

FIG. 1 illustrates an example configuration of a robotic system that may be used in connection with the embodiments described herein. The robotic system 100 may be configured to operate autonomously, semi-autonomously, and/or using directions provided by user(s). The robotic system 100 may be implemented in various forms, such as a biped robot, quadruped robot, a wheeled robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some embodiments, the data storage 104 can be a single physical device. In other embodiments, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks) interface between any combination of the mechanical components 110, the sensor(s) 112, the power source(s) 114, the electrical components 116, the control system 118, and/or a user of the robotic system 100. In some embodiments, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. For instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location. Alternatively, the control system may receive input indicating an instruction to move along a particular route or path. The control system 118 may determine a speed and/or gait based on the environment and may also alter or adjust the route or path or portions thereof based on the environment.

Operations of the control system 118 may be carried out by the processor(s) 102. Alternatively, these operations may be carried out by the controller 108, or a combination of the processor(s) 102 and the controller 108. In some embodiments, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include motors and actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some embodiments, the robotic system 100 may include one or more removable and/or replaceable battery units or sensors. Other types of removable components may be included within some embodiments.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment, the surface geometry of the environment, or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. The sensor(s) 112 may measure both linear and angular velocity and/or acceleration. For instance, the sensor(s) 112 may include an inertial measurement unit (IMU) having a 3-axis accelerometer, a 3-axis gyroscope, and a 3-axis magnetometer. The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, tracks, treads, and so on. In general, the robotic system 100 may be configured with zero or more legs. An implementation of the robotic system with zero legs may include wheels, tracks, treads, or some other form of locomotion. An implementation of the robotic system with two legs may be referred to as a biped or bipedal robot, and an implementation with four legs may be referred as a quadruped or quadrupedal robot. Implementations with six or eight legs are also possible. For purposes of illustration, biped and quadruped implementations of the robotic system 100 are described below.

Figure 2:
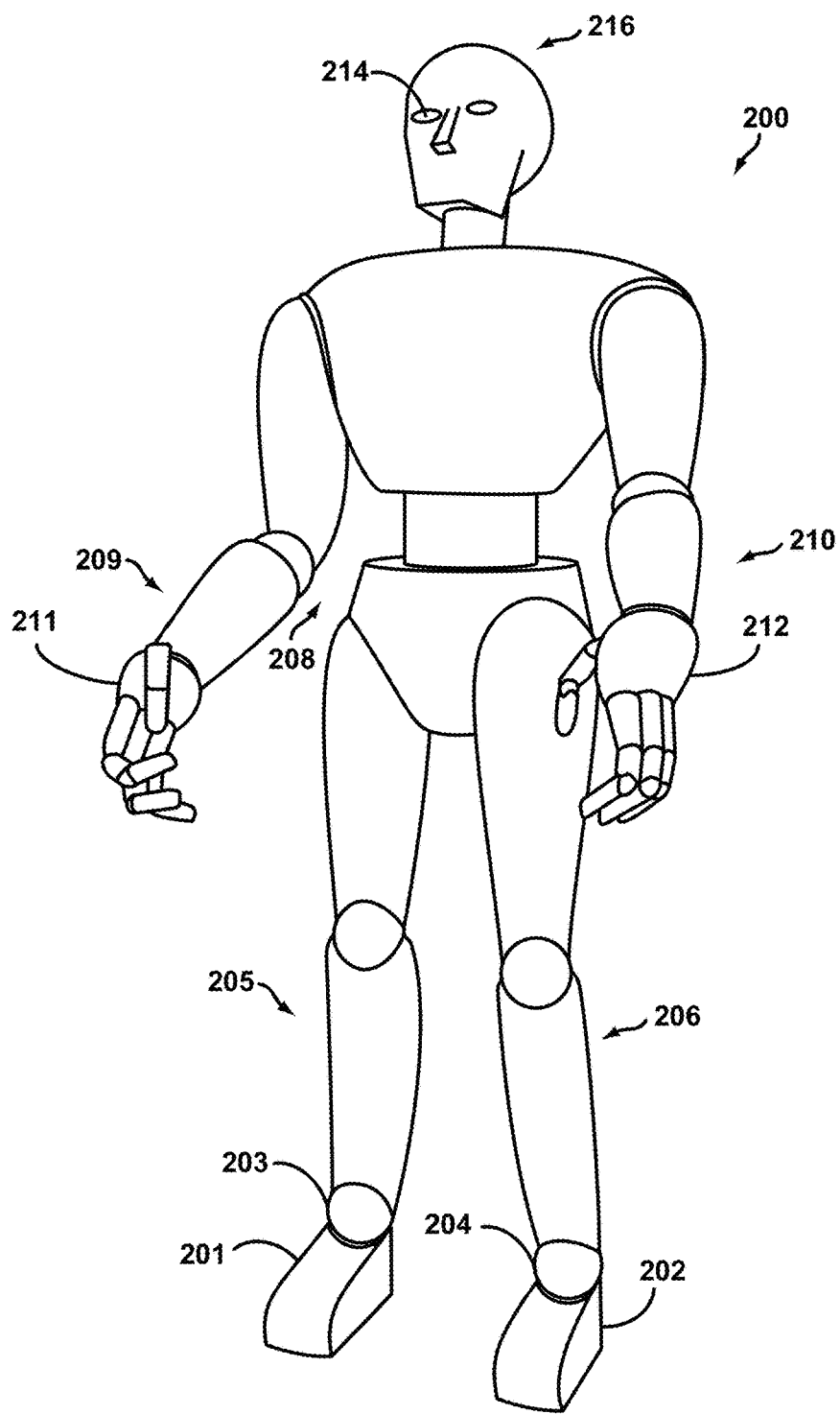
FIG. 2 illustrates a biped robot, according to an example embodiment.

FIG. 2 illustrates a biped robot 200 according to an example embodiment. The robot 200 may correspond to the robotic system 100 shown in FIG. 1, and may be configured to perform some of the implementations described herein. Thus the robot 200 may include one or more of mechanical components 110, sensor(s) 112, power source(s) 114, electrical components 116, and/or control system 118.

For example, the robot 200 may include legs 205 and 206 connected to a body 208. Each leg may consist of one or more members connected by joints and configured to operate with various degrees of freedom with respect to one another. Each leg may also include a respective foot 201 and 202, which may contact a surface (e.g., the ground surface). A contact surface of the foot may have a particular shape and size, such as, for example, square, rectangular, circular, oval, triangular or a number of other regular and irregular shapes. The control system may take into account the size and shape of the foot contact surface in planning the gait or motion of the robot 200. The legs 205 and 206 may be coupled to their respective feet via ankle joints 203 and 204 respectively. The ankle joints may provide multiple degrees of freedom and articulation, such as pitch, yaw, and roll. The legs 205 and 206 may enable the robot 200 to travel at various speeds according to the mechanics set forth within gaits.

The robot 200 may also include arms 209 and 210. These arms may facilitate object manipulation, load carrying, and/or balancing for the robot 200. Like legs 205 and 206, each arm may consist of one or more members connected by joints and configured to operate with various degrees of freedom with respect to one another. Each arm may also include a respective hand 211 and 212. The robot 200 may use hands 211 and 212 for gripping, turning, pulling, and/or pushing objects. The hands 211 and 212 may include various types of appendages or attachments, such as fingers, grippers, welding tools, cutting tools, and so on.

The robot 200 may also include sensor(s) 214, corresponding to sensor(s) 112, and configured to provide sensor data to its control system. In some cases, the locations of these sensors may be chosen in order to suggest an anthropomorphic structure of the robot 200 as well as provide a high vantage point (point of view of the sensor) for data acquisition. Thus, as illustrated in FIG. 2, the robot 200 may contain vision sensors (e.g., cameras, infrared sensors, object sensors, range sensors, etc.) within its head 216.

Figure 3:
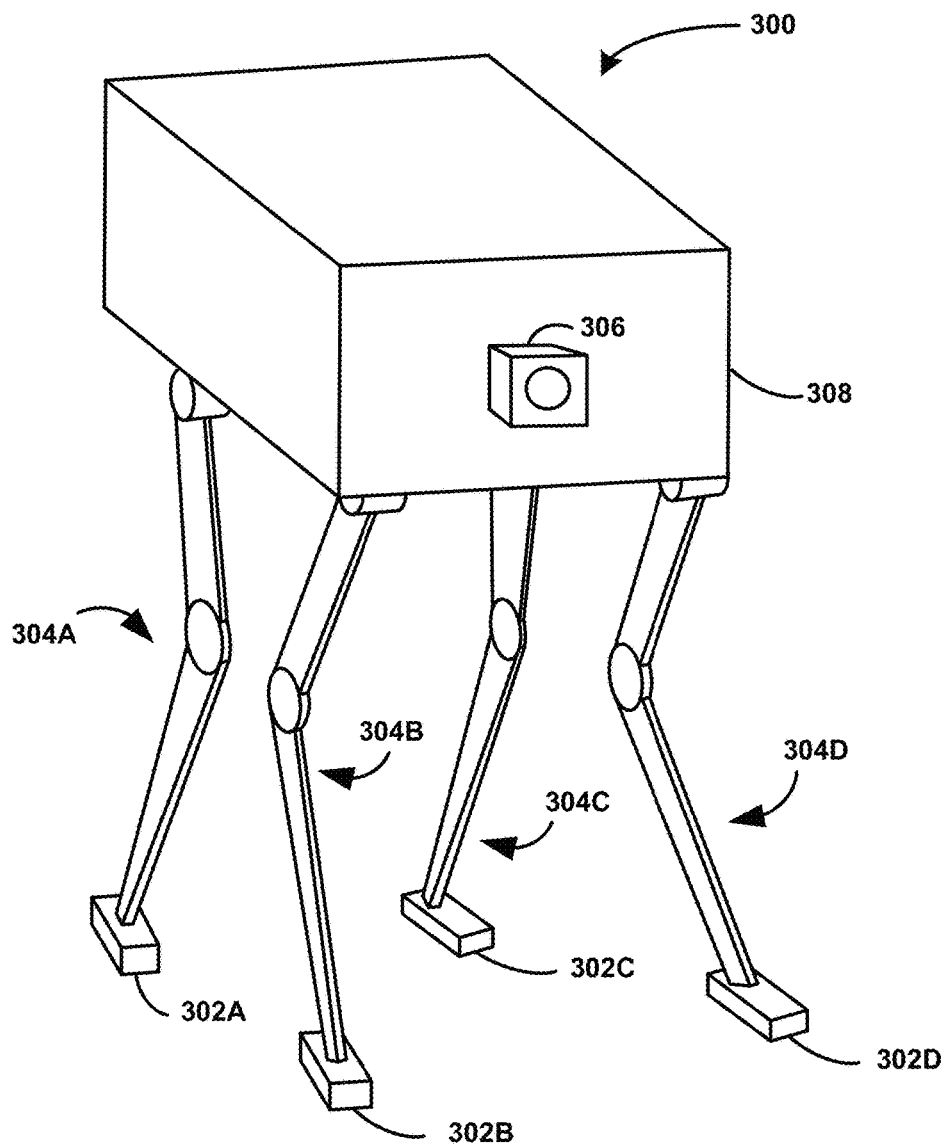
FIG. 3 illustrates a quadruped robot, according to an example embodiment.

FIG. 3 illustrates a quadruped robot 300, according to an example implementation. Among other possible features, the robot 300 may be configured to perform some of the operations described herein. The robot 300 includes a control system, and legs 304A, 304B, 304C, 304D connected to a body 308. Each leg may include a respective foot 302A, 302B, 302C, 302D that may contact a surface (e.g., a ground surface). As in the case of the biped robot 200, a contact surface of the foot may have a particular shape and size. The control system 118 may account for the shape and size of the foot contact surface in planning the gait or motion of the robot 300. Further, the robot 200 is illustrated with sensor(s) 306, and may be capable of carrying a load on the body 308. Within other examples, the robot 300 may include more or fewer components, and thus may include components not shown in FIG. 3.

The robot 300 may be a physical representation of the robotic system 100 shown in FIG. 1, or may be based on other configurations. Thus, the robot 300 may include one or more of mechanical components 110, sensor(s) 112, power source(s) 114, electrical components 116, and/or control system 118, among other possible components or systems.

The configuration, position, and/or structure of the legs 304A-304D may vary in example implementations. The legs 304A-304D enable the robot 300 to move relative to its environment, and may be configured to operate in multiple degrees of freedom to enable different techniques of travel. In particular, the legs 304A-304D may enable the robot 300 to travel at various speeds according to the mechanics set forth within different gaits. The robot 300 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 302A-302D. Similarly, gaits may also be classified based on ambulatory mechanics. The robot 300, however, may utilize different gaits from that of the robot 200, due at least in part to the differences between biped and quadruped capabilities.

The body 308 of the robot 300 connects to the legs 304A-304D and may house various components of the robot 300. For example, the body 308 may include or carry sensor(s) 306. These sensors may be any of the sensors discussed in the context of sensor(s) 112, such as a camera, LIDAR, or an infrared sensor. Further, the locations of sensor(s) 306 are not limited to those illustrated in FIG. 3. Thus, sensor(s) 306 may be positioned in various locations on the robot 300, such as on the body 308 and/or on one or more of the legs 304A-304D, among other examples.

III. EXAMPLE IMPLEMENTATIONS

Example implementations are discussed below involving a method of terrain evaluation for a support member of a mobile robot. The term "support member" as used herein is meant to encompass any structure that a robotic device may use for movement or locomotion on a ground surface such as, but not limited to, legs, feet, wheels, tracks, or treads. Further, the term "terrain" as used herein is meant to encompass any possible surface that the robot may encounter, and is not meant to be limiting. For instance, the terrain may be indoors or outdoors, may be rigid or loose, such as sand or gravel, and may include discontinuities or irregularities such as stairs, platforms, rocks, fallen trees, debris, and the like. Numerous other examples exist.

Additionally, the term "support region" as used herein may be any region or portion of the terrain encountered by the robot. A particular support region may be classified as "foot-placeable", meaning that the particular support region is capable of offering sufficient support to the support member such that the robot can continue standing or moving without tripping, falling, losing balance, or otherwise affecting gait or movement. A particular support region may also be classified as not foot-placeable, meaning that the particular support region may contain features that are likely to cause the robot to trip, fall, or otherwise inhibit gait or movement. A support region may be smaller, larger, or equal in size to the area of the support member in contact with the support region.

A. Example Features of a Terrain.

A robotic device may encounter a variety of topological features or surface geometries of a terrain while moving through an environment. The topological features may or may not be problematic for the robot, depending on their location, geometry, and size in relation to the robot. It may be desirable to select support regions for the support member of a robotic device that are free of obstacles and other problematic features.

Figure 4C:
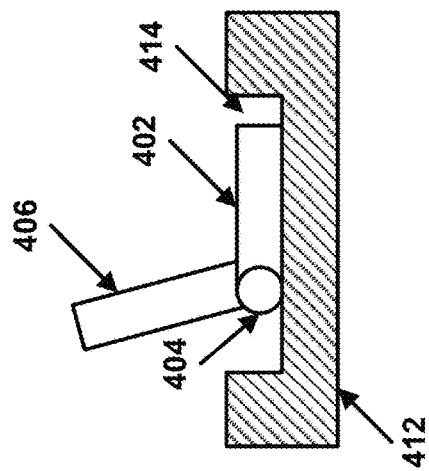
FIGS. 4A-4C illustrate support regions that are foot-placeable, according to an example embodiment.
Figure 4B:
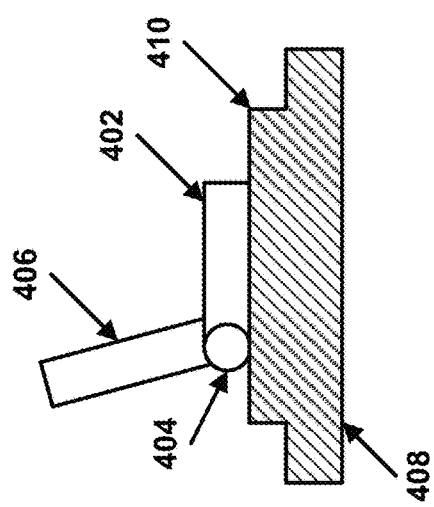
Figure 4A:
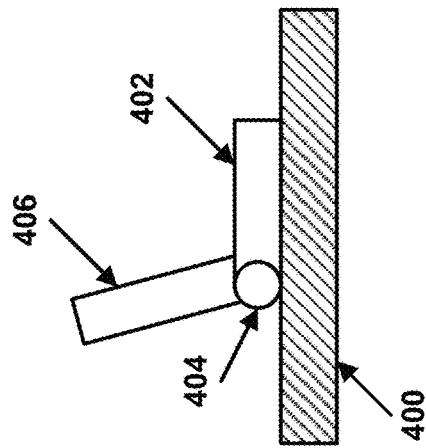

FIGS. 4A-4C collectively depict side views of a series of exemplary support regions that may be classified as foot-placeable. The depicted support regions may be part of a more extensive terrain or environment not shown herein. FIG. 4A shows a robotic foot 402 coupled to a robotic leg 406 via an ankle joint 404. The ankle joint may have multiple degrees of freedom and articulation such as pitch, roll, and yaw. The robotic foot is supported by support region 400 having no obstacles or problematic features. FIG. 4B shows a support region 408 having an elevated portion 410. Support region 408 may likewise be classified as foot-placeable due to the fact that the elevated portion 410 is larger than the robotic foot 402 and is therefore capable of supporting the robotic foot 402. FIG. 4C shows a support region 412 having a depression 414. Support region 412 may also be classified as foot-placeable due to the fact that the depression 414 is larger than the robotic foot 402 and the depression is therefore capable of properly supporting the robotic foot 402.

Figure 5C:
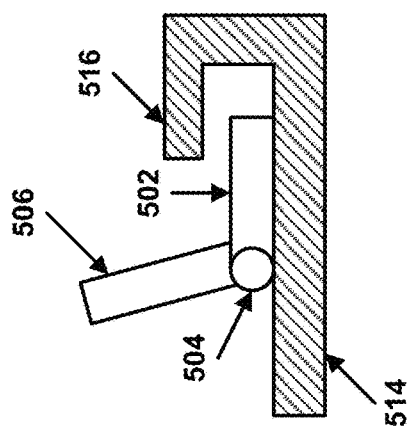
FIGS. 5A-5C illustrate support regions that are not foot-placeable, according to an example embodiment.
Figure 5B:
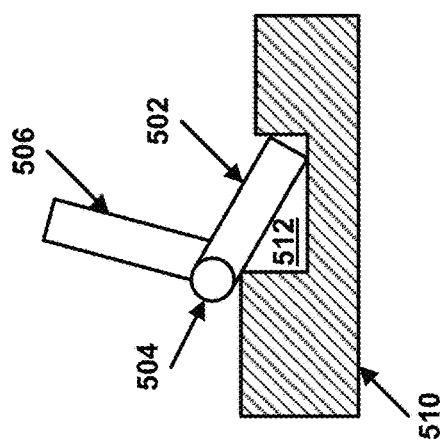
Figure 5A:
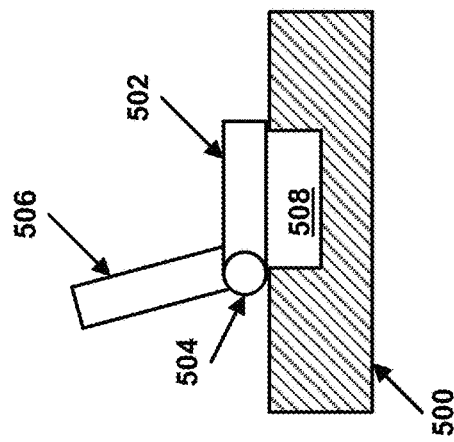

In contrast, FIGS. 5A-5C collectively depict side views of a series of support regions 500, 510, and 514 that may be classified as not foot-placeable. FIGS. 5A-5C depict robotic foot 502 coupled to robotic leg 506 via ankle joint 504. As with FIGS. 4A-4C, the depicted support regions may be part of a more extensive terrain or environment not shown herein. FIG. 5A shows a support region having therein a depression 508. Placing the robotic foot 502 over the depression 508 may result in the robotic foot 502 unexpectedly slipping into the depression 508, causing the robot to lose balance and fall over. Similarly, FIG. 5B depicts the robotic foot 502 stepping toe-first into depression 512 which may cause the robot to trip, lose balance, and/or fall over. FIG. 5C depicts a support region 514 having an overhang 516. The robotic foot 502 may clip the overhang 516 or may get entirely stuck under the overhang 516, resulting in the robot undesirably losing balance and/or falling over, potentially resulting in damage to parts of the robot.

Support regions may have a variety of different features in addition to those depicted in FIGS. 4A-4C and 5A-5C. For example, FIGS. 6A-6E collectively depict support regions having different degrees of inclination. FIGS. 6A-6E depict robotic foot 602 coupled to robotic leg 606 via ankle joint 604. Support region 600 may have an inclination such that placing the robotic foot 602 on either side of the incline 600 may cause the robot to lose balance due to the robotic foot 602 unexpectedly sliding down the incline 600. Similarly, placing the robotic foot 602 at the peak of the inclined support region 600 may result in the robot tipping over unpredictably. However, it may be determined that the degree of inclination is such that the region is foot-placeable. For example, FIGS. 6D and 6E depict a support region 608 having a lesser degree of incline than support region 600. Consequently, the methods presented herein may be used to determine that the support region 608 is foot-placeable.

B. Example Methods of Terrain Evaluation.

Figure 7:
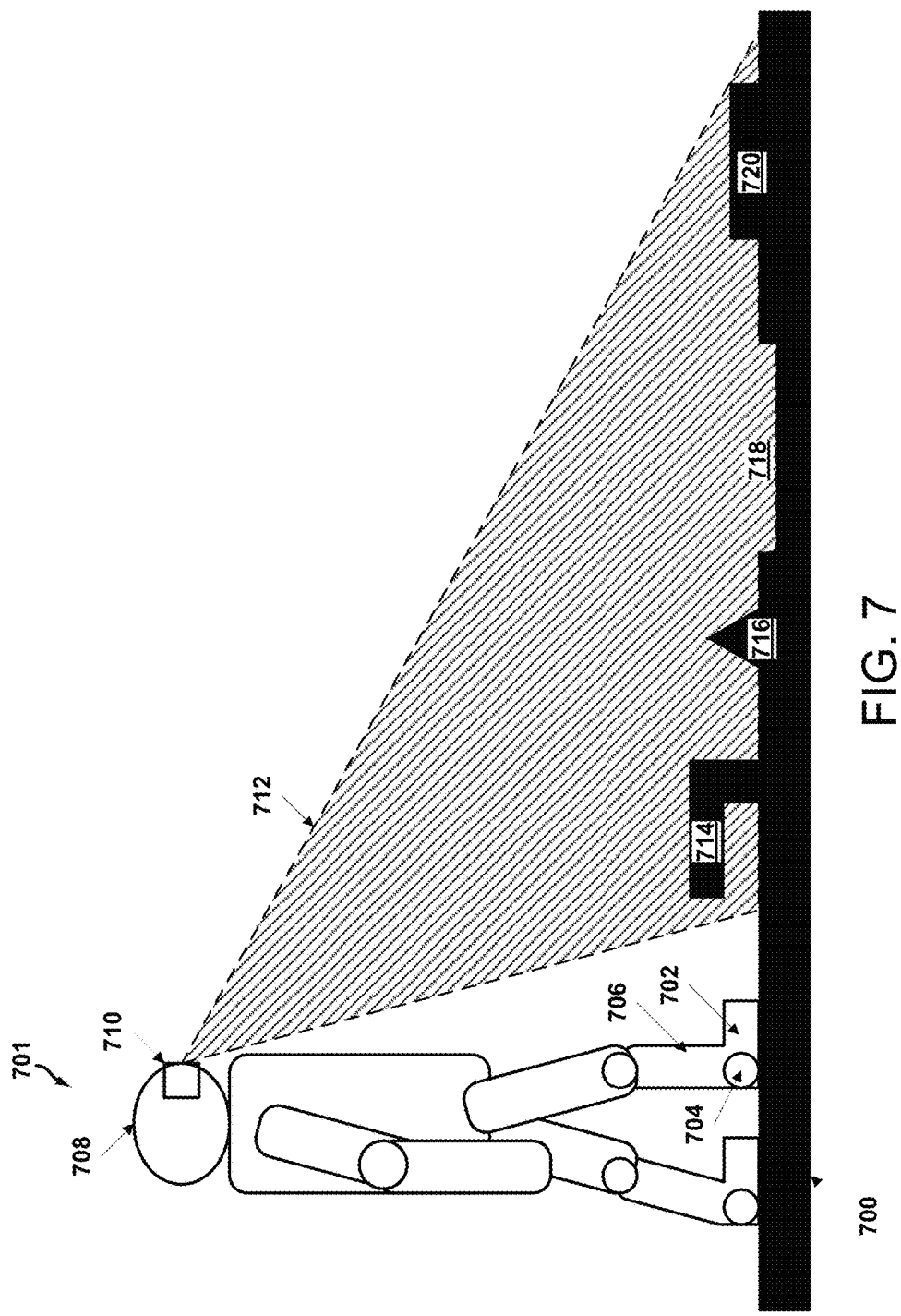
FIG. 7 illustrates a biped robot performing a scan of a terrain, according to an example embodiment.

In order to evaluate the terrain of the environment surrounding a robot and select support regions on or in which to place the support member of the robotic device, the robotic device may perform a scan of the environment. FIG. 7 depicts a side-view bipedal robot 701 (such bipedal robot 200 depicted in FIG. 2) walking through a terrain 700 having a plurality of topological features 714, 716, 718, and 720. The robot 701 has a foot 702 attached to a leg 706 via ankle joint 704. The topological features 714, 716, 718, and 720 of terrain 700 may include additional 3D features not shown herein. The terrain 700 may be part of a more extensive 3D environment not shown herein.

The robot 701 is shown performing a scan of the terrain 700 using sensor 710 mounted to the head 708 of the robot 701. The sensors may be any combination of the sensors previously described herein as well as any other type of sensor capable of providing 2D, two-and-a-half-dimensional (2.5D), and/or 3D information indicative of the environment surrounding the robot 701. The sensor 710 is shown as having a field of view 712, capable of capturing information pertaining to the environmental features 714, 716, 718, and 720. The field of view of the sensor may be larger or smaller than field of view 712 depending on the type of sensor utilized by a particular implementation. For example, a sensor with a smaller field of view might not capture the environmental feature 720. Similarly, the field of view of the sensor 710 may extend as far as 360 degrees around the robot 701 or it may be lesser, such as 180 degrees depending on the particular choice of sensor.

Depending on the extent of the field of view 712 of the sensor 710, the robotic device 701 may be limited in the number of steps it can plan. For example, as shown in FIG. 7, the field of view 712 of vision sensor 710 encompasses all of the geometric features 714, 716, 718, and 720 of support surface 700. Consequently, the robotic device 701 may plan foot placement locations ranging anywhere between the current position of foot 702 all the way to environmental feature 720.

The methods described herein may allow the robotic device 701 to find support regions within the terrain 700 that may offer enough lateral and diagonal support such that the robotic device 701 can walk along terrain 700 without tripping or losing balance due to the topological features 714, 716, 718, and 720. For example, the methods described herein may allow the robotic device 701 to determine that the foot 702 can be safely placed on top of overhang 714, in the depression 718, and/or on top of the elevation 720, without causing a disturbance in the gait or motion of the robot that may cause the robot to trip and/or fall over undesirably. The robotic device may also determine that some motions of foot 702 may cause the foot 702 to get stuck under or interfere with the overhang 714. The robotic device may additionally determine that the triangular protrusion 716 does not offer sufficient diagonal support (the estimated incline of the region is greater than a first threshold value and/or the area of the inclined portion of the region is below a second threshold value) and placing the foot 702 on either of the sides or the top of protrusion 716 may cause the robot to trip and/or fall undesirably.

Figure 8:
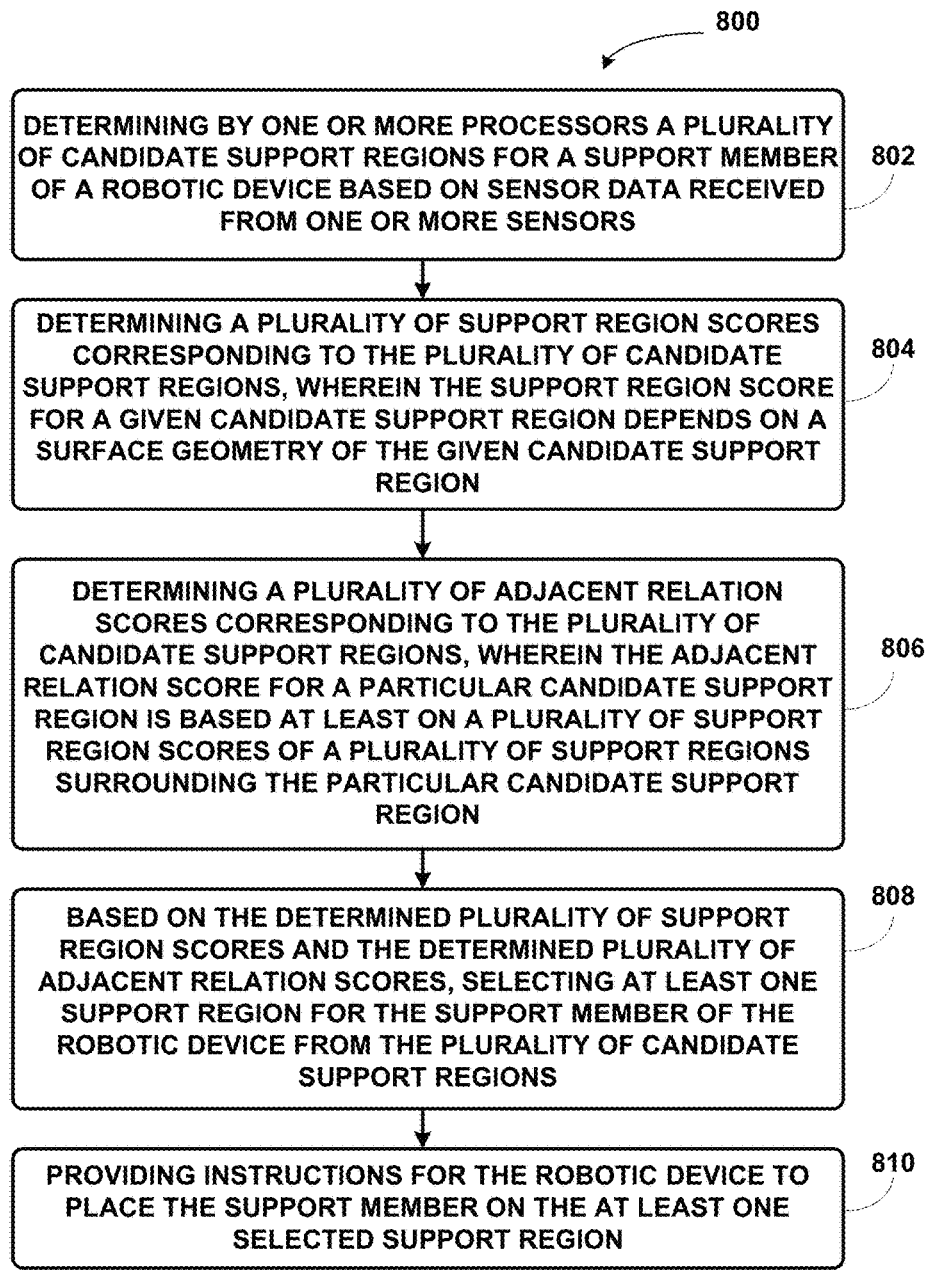
FIG. 8 is a block diagram of a method, according to an example embodiment.

FIG. 8 illustrates a flowchart showing a method 800 that may allow for terrain evaluation for a support member of a robotic device, according to an example embodiment. Method 800 may be carried out by a local control system 118 of exemplary robotic system 100. Alternatively, method 800 may be carried out by a control system remote to the exemplary robotic system 100. Flowchart 800 may include one or more operations or actions as illustrated by one or more of the blocks shown in each figure. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

As shown by block 802 of method 800, a robotic device may acquire sensor data representative of the environment (as well as the topological feature thereof) surrounding the robotic device. The sensor data may be used to construct a virtual environment representing the physical environment surrounding the robotic device. The robotic device may then determine a plurality of candidate support regions by dividing the virtual environment into a plurality of sub-regions. The plurality of sub-regions may be mutually exclusive or they may have overlapping portions. Similarly, the regions can all be of the same shape and size or may be chosen to have different shapes and/or different sizes. The shape and size of the regions may be based on the size of the contact area of the support member with the support surface (e.g. the area of a sole of the robotic foot 702 that is in contact with the terrain 700).

As shown by block 804, each of the plurality of determined candidate support regions may be assigned a first score, referred to as a support region score. The support region score may be indicative of the quality of a particular support region. Specifically, the score may indicate whether the particular candidate support region contains topological features (surface geometry) that may potentially interfere with the support member of the robotic device or may cause the support member to be placed in an unstable position or orientation, resulting in the robotic device tripping, losing balance, and/or falling down. An exemplary method of computing and assigning the support region score is provided later in the present disclosure.

The granularity of the process of dividing the virtual environment into a plurality of sub-regions (a plurality of candidate support regions) may be varied in order to achieve different degrees of accuracy in the scoring process. For example, in FIG. 7, if a particular candidate support region was determined to be the area containing topological features 716 and 718, the support region score may indicate that the particular candidate support region is not foot-placeable due to the presence of feature 716 in the candidate support region. However, by increasing the granularity of the process (by dividing that same area into a larger number of candidate support regions), each of features 716 and 718 may end up in a different candidate support region. The topological feature 716, or a portion thereof, may be the only topological feature in a first candidate support region and topological feature 718, or a portion thereof, may be the only topological feature in a second candidate support region. Consequently, the support region score of the first candidate support region may accurately indicate that the region is not foot-placeable due to topological feature 716 while the support region score of the second candidate support region may accurately indicate that the region is foot-placeable due to topological feature 718.

As shown by block 806, each of the plurality of determined candidate support regions may be assigned a second score, called an adjacent relation score. The adjacent relation score may be indicative of the quality of an area surrounding a particular support region. Specifically, the score may indicate whether the area around the particular candidate support region contains topological features (surface geometry) that may potentially interfere with the support member of the robotic device or may cause the robotic device to trip, lose balance, and/or fall down. An exemplary method of computing and assigning the adjacent relation region score is addressed later in the present disclosure.

As shown by block 808, a specific candidate support region or group of candidate support regions may be selected to serve as the support region in or on which the support member of the robotic device may be placed. The selected support region may have the highest SRS, ARS, and/or composite (total) score out of the plurality of determined candidate support regions. Selecting the support region based on the support region score as well as the adjacent relation score may allow the robotic device to account for inaccuracies and uncertainties in robotic motion potentially caused by sensor miscalibration, sensor drift, actuator or motor stiction, and unexpected disturbances among others. Specifically, the combination of the support region score and the adjacent relation score may ensure selection of the support region for the support member of the robotic device such that even if during locomotion the support member lands outside of the selected support region, the area surrounding the selected support region may still offer sufficient support for the support member such that the robotic device can proceed in its motion undisturbed, without tripping over obstacles and potentially falling.

As shown by block 810, instructions are provided to the robotic device to place the support member on or in the selected support region or group of support regions. In some embodiments, instructions may be provided to robotic system 100 by control system 118. Alternatively, the instructions may be provided by a remote control system in communication with exemplary robotic device 100. In some embodiments, local control system 118 may work in combination with a remote control system in order to perform elements of the method and provide instructions to the exemplary robotic device 100.

In some embodiments, the SRS, the ARS, and/or the composite (total) score may additionally or instead be displayed on a graphical user interface (GUI). The GUI may provide information to an operator or user of the robotic device regarding aspects of the robotic system's operation. For example, the GUI may display a series of steps that the robotic system is expected to take. The GUI may display a virtual representation of a physical environment for which the robotic device has acquired sensor data along with a plurality of SRS, ARS, and/or composite (total) scores for candidate support regions determined within the physical environment. The GUI may additionally or instead allow the operator to control the robotic device. The GUI may be located on a computing device in close proximity (local) to the robotic device or may be operated remotely from a computing device via wired or wireless communication with the robotic device. In some embodiments, the operator may be able to specify a desired gait, speed, geographic destination, and/or a desired direction of travel for the robotic device. The GUI may also or instead be used by the operator of the robotic device to select a support region for the support member of the robotic device from the plurality of candidate support regions. The operator may make the choice based on a combination of sensor data from sensors on the robotic device and the SRS, ARS, and/or composite (total) scores corresponding to the plurality of candidate support regions displayed on the GUI.

FIG. 9 depicts a plurality of candidate support regions 900-915, each assigned a support region score (SRS), an adjacent relation score (ARS), and a total (composite) score. The SRS, the ARS, and the total score may each range from 0 to 1. A score of 0 may represent a region that is not foot-placeable and 1 may represent a region that is highly foot-placeable with values in between 0 and 1 representing a corresponding degree of foot-placeability. The particular range of the scores is a design choice and may be different depending on how the score is computed. FIG. 9 may be one possible visual representation of the output of the method described in FIG. 8. Specifically, each of the plurality of candidate support regions 900-915 corresponds to a portion of the environment in which a robot is walking or otherwise moving. Regions 900-915 represent the extent of the environment for which sensor data has been acquired. All of the candidate support regions 900-915 are rectangular and equal in size. The support region scores and adjacent relation scores may be computed and assigned through any of the methods or derivatives of the methods described in the present disclosure.

In the embodiment depicted in FIG. 9, the adjacent relation score for a particular candidate support region is computed as the average of the candidate support region scores of the candidate support regions surrounding the particular candidate support region. For example, the ARS of region 905 is the average of the SRS of regions 900, 901, 902, 904, 906, 908, 909, and 910. The ARS of region 900 is computed as the average of the SRS of region 901, 904, and 905. In general, the ARS may additionally or instead depend on different properties of the adjacent surrounding regions, such as those described later with reference to FIGS. 16A and 16B. The specific process of computing the ARS may consider more or fewer adjacent candidate support regions.

For example, a particular embodiment may calculate the ARS for region 905 as the average of the SRS of regions 901, 904, 906, and 909.

The composite (total) score may be computed as the average of the adjacent relation score and the support region score as depicted in FIG. 9. Alternatively, other embodiments may compute the total score or total composite score in different ways, such as, for example, as a weighted sum of the SRS and the ARS or by considering only one of the SRS and the ARS. The process of selecting a support region on or in which to place the support member of the robotic device may involve selecting a candidate support region with the highest total score. Alternatively, the process of selecting a support region may involve determining that a particular candidate support region has a SRS above a first threshold and an ARS above a second threshold. In some embodiments, a low SRS or ARS may correspond to a region that is foot-placeable while a high SRS or ARS may correspond to a region that is not foot-placeable. Such embodiments may select a support region based on determining that a particular candidate support region has a SRS below a first threshold and an ARS below a second threshold. In the case where the support member of the robotic device is larger than a single candidate support region (e.g. the area of a robotic foot is larger than a single candidate support region), multiple neighboring support regions may be selected in order to properly support the robotic support member. Alternatively, the selection process may be discretized. For example, any candidate support region with a total score equal to or greater than 0.5 may be considered foot-placeable.

Figure 10:
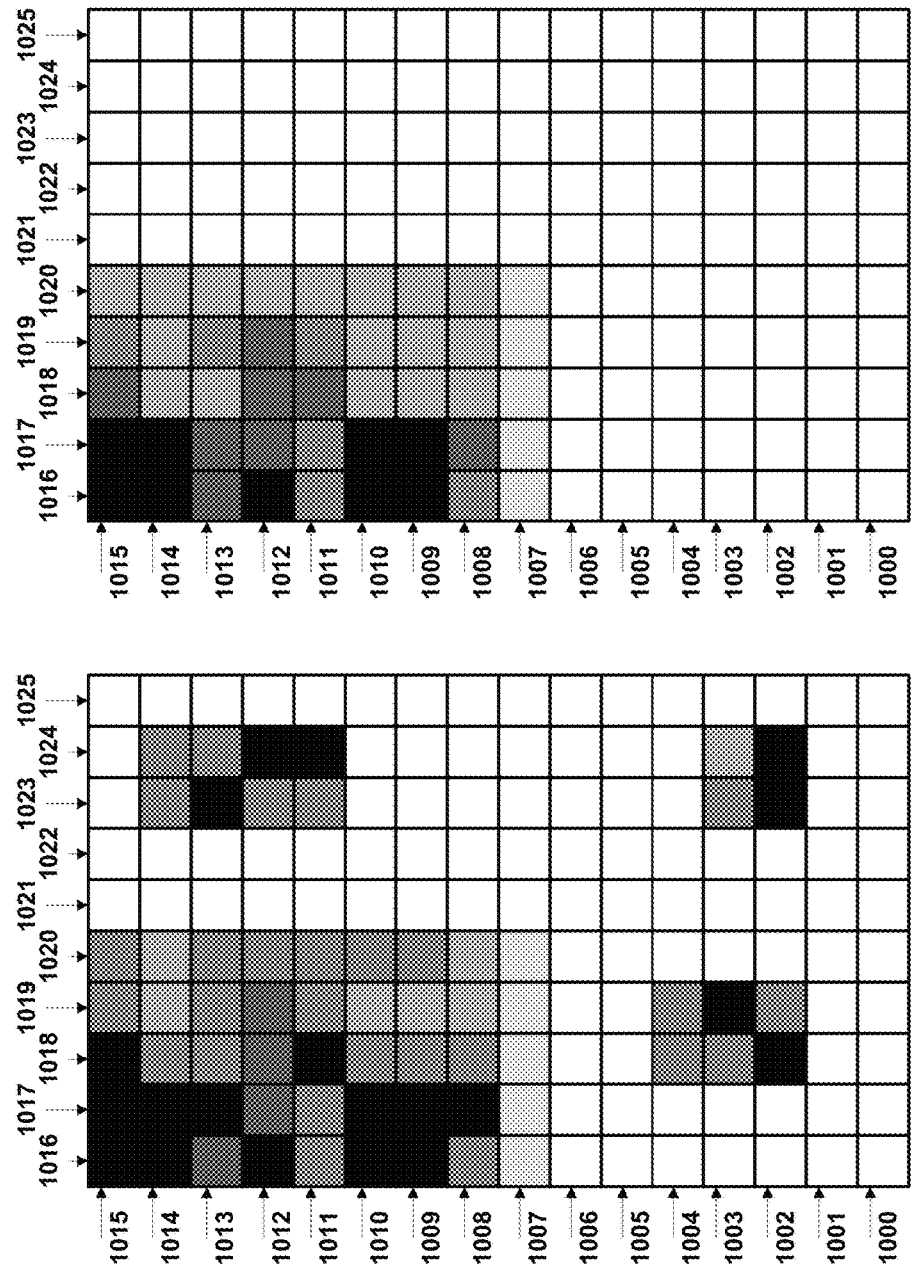
FIG. 10A illustrates a gray-scale heat map of a plurality of support region scores assigned to a plurality of candidate support regions, according to an example embodiment.
FIG. 10B illustrates a gray-scale heat map of a plurality of composite support region scores assigned to a plurality of candidate support regions, according to an example embodiment.

FIGS. 10A and 10B show an alternative representation of the support region scores, adjacent relation scores, and the total composite scores for a plurality of candidate support regions. FIGS. 10A and 10B show a gray-scale heat map where each square of the grid represents a candidate support region corresponding to a portion of a physical environment. The grid is defined by rows 1000-1015 and columns 1016-1025. In FIG. 10A, the shade of gray of a particular square of the grid corresponds to the SRS of that particular square; black corresponds to a highly foot-placeable region and white corresponds to a region that is not foot-placeable. Using only the support region score in determining the total score of the plurality of candidate support regions, as depicted in FIG. 10A, may result in a large number of candidate support regions being classified as foot-placeable. For example, the candidate support regions bounded by rows 1007-1015 and columns 1016-1020 (large patch of black and gray squares in the upper left quadrant, called "region 1" hereafter) may be considered foot-placeable. Likewise, the candidate support regions bounded by rows 1002-1004 and columns 1018-1019 (called "region 2" hereafter), rows 1002-1003 and columns 1023-1024 (called "region 3" hereafter), as well as rows 1011-1014 and columns 1023-1024 (called "region 4" hereafter) may also be considered to be foot-placeable.

In FIG. 10B, the shade of gray of a particular square of the grid corresponds to the total score of that particular square. The total score may be computed based on the SRS and the ARS via any of the methods previously described. Using a combination of the SRS and the ARS results in a much more discriminating scoring process that accounts for the quality of a particular support region as well as the quality of the regions around it. Specifically, it can be observed from FIG. 10B that using both the SRS and the ARS may result in only region 1 being considered foot-placeable. Regions 2-4 which may have been considered foot-placeable in FIG. 10A, are no longer considered foot-placeable as they are surrounded by regions that are not foot-placeable (region 2-4 are surrounded by white squares in FIG. 10A). Consequently, by utilizing both the SRS and the ARS, the robotic device may be able to handle a larger degree of inaccuracy and uncertainty in the placement of the support member, potentially caused by factors previously described, as the robotic device moves through an environment. Additionally, the robotic device may be minimizing the probability of tripping over, losing balance, and/or falling by selecting support regions with high SRS, ARS, and/or composite (total) scores for the support member.

Figure 11:
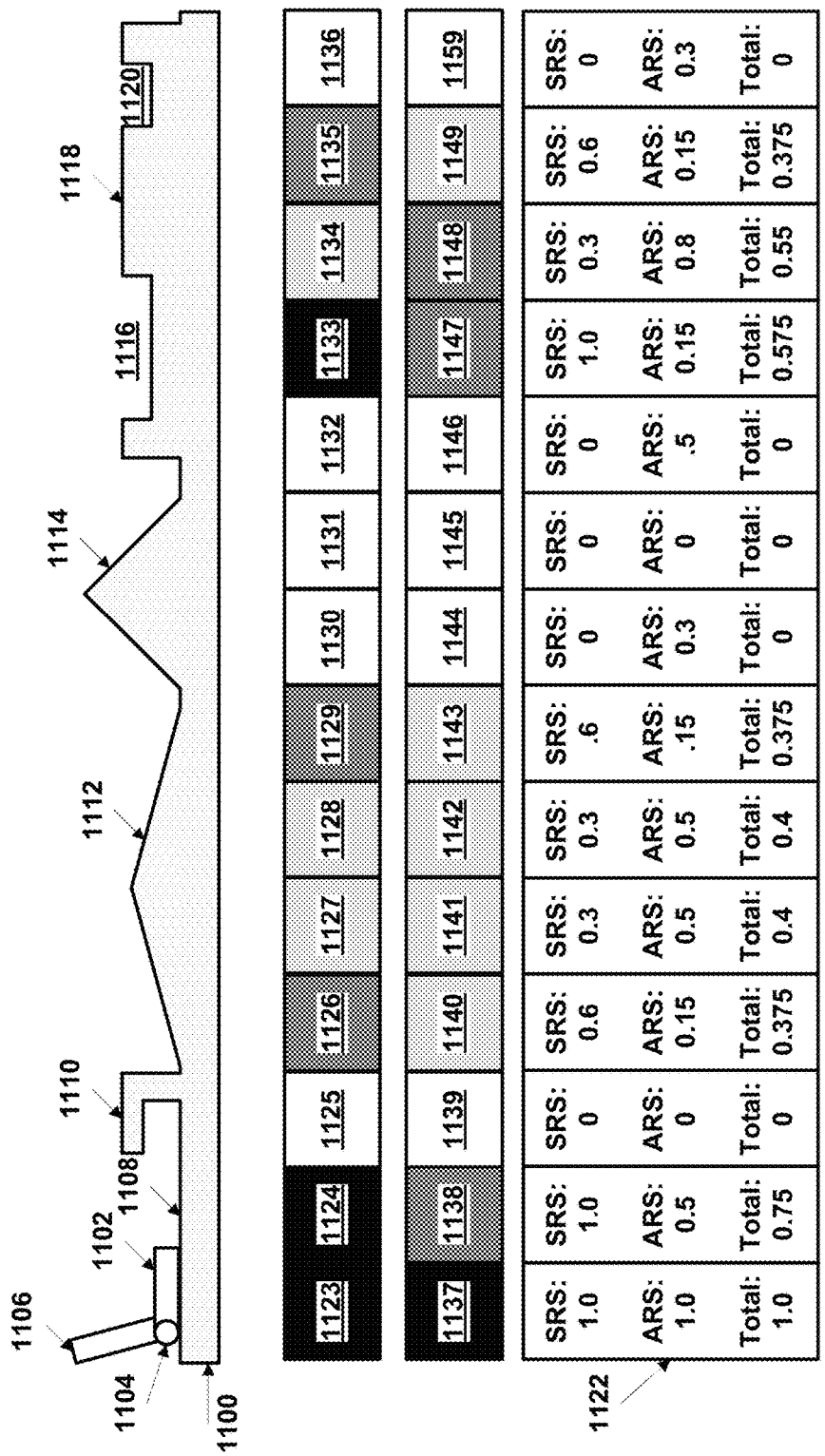
FIG. 11 illustrates a cross-section of a terrain along with scores assigned to portions of the terrain, according to an example embodiment.

FIG. 11 illustrates an example of how particular topological features of a terrain may correspond to a SRS, ARS, and a total score for the region. In the depicted embodiment, a robotic device having a robotic foot 1102, attached to a robotic leg 1106 via ankle joint 1104, may plan to traverse the terrain 1100 having a plurality of topological features 1108-1120. Although FIG. 11 is depicted in 2D for illustrative purposes, the methods described herein are not to be construed as limited to 2D. Likewise, the numbers presented in the Figures are intended for illustrative purposes only and are not meant to be limiting.

The series of squares 1123-1159 represent a gray-scale heat map similar to FIGS. 10A and 10B. The series of squares 1123-1136 represent the SRS of the corresponding portions of the environment located directly above each square. Similarly, the series of squares 1137-1159 represent the total composite score, based on the SRS and the ARS, of the corresponding portions of the environment located directly above each square. Squares 1123-1136 represent the same corresponding candidate support regions as squares 1137-1159 (e.g. square 1124 and square 1138 represent different scores of the same candidate support region). A black square corresponds to a score of 1, dark grey represents a score greater than 0.5 but below 1, light gray represents a score greater than 0 but below 0.5. Table 1122 presents the SRS, ARS, and the total composite score of the corresponding portions of the environment located directly above each column of the table.

For example, candidate support region 1131 represents the portion of the environment 1100 containing the right half of the triangular topological feature 1114. Due to the large degree of inclination, the methods presented in this disclosure may determine candidate support region 1131 to have a low SRS and therefore not be foot-placeable, as shown by the white color of region 1131. In contrast, candidate support region 1133 represents the portion of the environment 1100 containing the depression 1116. Since the robotic foot 1102 can easily fit in the depression 1116, candidate support region 1133 may be determined to have a high SRS and therefore be foot-placeable, as shown by the black color of region 1133.

However, since candidate support region 1133 is adjacent to region 1132, having a SRS of 0, and region 1134, having a SRS of 0.3, inaccuracies and uncertainties in robotic motion may result in at least a portion of the robotic foot 1102 landing in region 1132 (a configuration similar to FIG. 5B) or region 1134. In order to account for this possibility, the ARS of the candidate support region containing the topological feature 1116 may be computed as the average of the SRS of regions 1132 and 1134 (ARS for region 1133 is 0.15). The total score may be computed as the average of the SRS and ARS, as shown in the table (total score for region 1133 is 0.575) and depicted by square 1147. Consequently, although based on SRS alone, the portion of the environment represented by region 1133 may appear to be highly foot-placeable (SRS of 1), accounting for the quality of the adjacent support regions results in a significantly lower total score (total score of 0.575). Although the SRA, ARS, and the total score may be computed in various ways, utilizing a combination of the SRS and the ARS may result in a more intelligent choice of support region for the support member of the robotic device.

Figure 12:
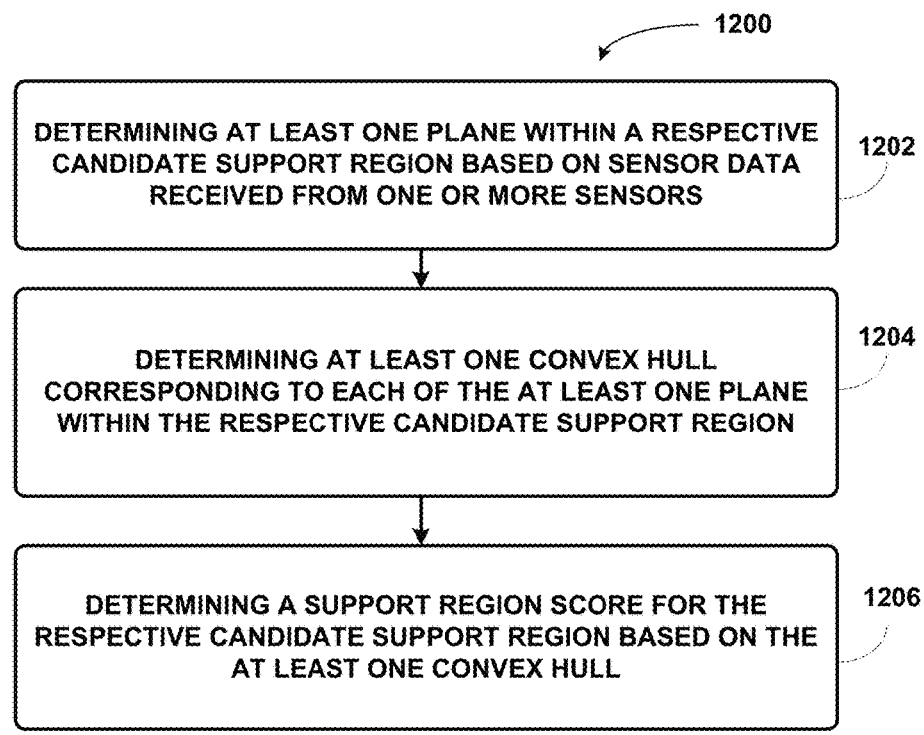
FIG. 12 is a block diagram of another method, according to an example embodiment.

In order to utilize the SRS and ARS scores as described above, the scores are first computed based on sensor data indicative of the topological features of an environment. FIG. 12 illustrates one potential method of computing the support region score of a particular candidate support region. As shown by block 1202, a robotic device may determine at least one plane within a respective candidate support region. The data acquired from the sensors may be in the form of a 3D point cloud. FIG. 14A illustrates a candidate support region 1400 containing a plurality of data points 1402 from which planes may be extracted. Planes may be found within a particular candidate support region by considering all the data points contained in the particular candidate support region that fit a plane model. The method may utilize any plane extraction process such as, but not limited to, Random sample consensus (RANSAC), Hough transform, or least squares fit. The extracted planes may have a thickness which may be a design parameter used to limit the number of potential planes extracted from a given candidate support region.

Following plane extraction, the method proceeds to block 1204 in which a convex hull is computed for each of the extracted planes. The convex hull may represent an envelope of all the points that fit the plane model of a respective plane. The points that fit a particular plane model may be a subset of the data points 1400. The convex hull may be 2D or 3D, depending on the particular implementation. FIG. 14B illustrates a convex hull 1414 of a particular plane determined in the candidate support region 1400. The convex hull 1414 defines the boundary of all the data points 1402 in candidate region 1400 that form the basis for the one particular extracted plane depicted in FIGS. 14B-14F.

As shown by block 1206, the robotic device may determine a score for the respective candidate support region based on the computed convex hull. In the case of a 2D convex hull, the score may be computed as the area enclosed in the convex hull 1414 divided by the total area of the respective candidate support region 1400. The area of the convex hull represents the portion of the candidate support region that is approximately planar and may therefore offer stable support for the support member of the robotic device. Computing the score in this manner indicates the fraction of the area of the candidate support region that adheres to a plane model (is largely flat, and free of irregularities in terrain) and can properly support a support member of a robot such that the robot is unlikely to trip, lose balance, and/or fall over. In the case of a 3D convex hull, the score may be the volume of the convex hull divided by the volume of the extracted plane (since the plane may have a thickness, it may therefore have a volume). In the case where multiple planes have been extracted from a candidate support region, a convex hull determined for each plane, and a score (or sub-score) computed based on each convex hull, the process of computing the overall score may be different among implementations. For example, the overall score for the given candidate support region may be taken as the lowest of the computed sub-scores, the highest of the computed sub-scores, the average of the computed the sub-scores, or any other combination of the computed sub-scores.

An exemplary robotic device may be expected to place the support member approximately in the center of the selected support region. Consequently, candidate support regions that do not contain a planar surface near the center 1404 of the exemplary candidate support region 1400 may be classified as not foot-placeable. In some embodiments, when it is determined that a convex hull determined for a particular plane does not enclose the center 1404 of the corresponding candidate support region (a case where the center 1404 is outside the area of convex hull 1414), the particular plane may be assigned a score of zero, indicating that the plane is not foot-placeable. When the particular plane is the only plane extracted from the corresponding candidate support region, the corresponding candidate support region may be assigned a SRS of zero, indicating that the candidate support region is not foot-placeable. In some embodiments, the SRS score may be computed via the methods described above only when it is determined that the determined convex hull encloses the center of the candidate support region. When a particular candidate support region contains more than one plane, the particular plane may be excluded from consideration, a score of zero may be assigned to the particular plane, or a score of zero may be assigned to the candidate support region.

Figure 13:
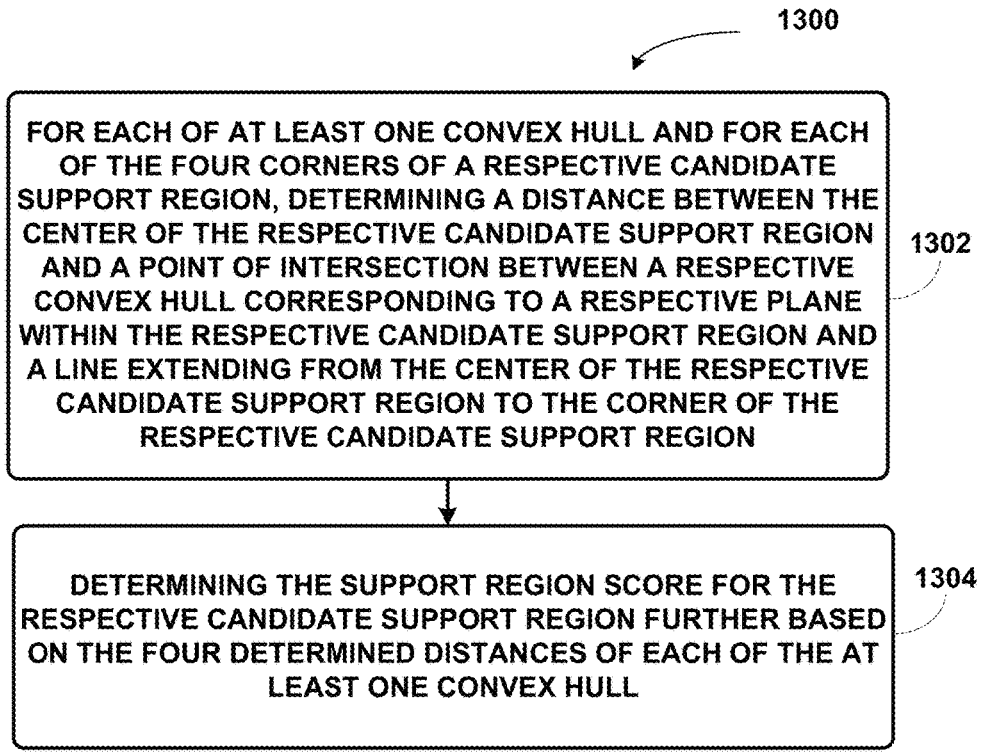
FIG. 13 is a block diagram of a further method, according to an example embodiment.

The process of computing the support region score may be otherwise augmented, modified, or replaced by the exemplary method 1300 illustrated by FIG. 13. A potential embodiment of method 1300 is illustrated by FIGS. 14C-14F. In FIG. 14C, a virtual line is drawn between the center 1404 of candidate support region 1400 and a corner 1406 of the candidate support region, as described by block 1302. Next, a point of intersection between the drawn virtual line and the convex hull is determined. Finally, the length 1416 of the virtual line segment between the determined point of intersection and the center of the candidate support region 1404 is computed. This process is repeated for the remaining three corners 1408, 1410, and 1412 of the rectangular support region 1400 as illustrated by FIGS. 14D, 14E, and 14F respectively and block 1302 of FIG. 13. Similar to basing the SRS on the convex hull, computing the score in this manner indicates the fraction of the area of the candidate support region that is largely planar and therefore very likely to offer sufficient support for a support member of a robotic device.

Although the example embodiment involves drawing a virtual line, other embodiments may compute the distances 1416, 1418, 1420, and 1422 via different, more direct methods. The step of drawing the virtual line is described in order to visually illustrate the process of determining the distances 1416, 1418, 1420, and 1422.

The particular process of converting the distances 1416, 1418, 1420, and 1422 to a support region score, illustrated by block 1304, may vary among embodiments. One potential approach for computing the support region score may involve taking the average of the distances 1416, 1418, 1420, and 1422. However, other embodiments may assign the SRS to be the minimum, the maximum, or a weighted linear combination of the four determined distances 1416, 1418, 1420, and 1422. Some embodiments may determine the SRS based on a combination of the properties of the convex hull as described above and the four determined distances 1416, 1418, 1420, and 1422. Other embodiments may utilize only the four determined distances.

The four determined distances 1416, 1418, 1420, and 1422 illustrated in FIGS. 14C-14F may appear to be approximately of equal length and may indicate a candidate support region that is largely planar. In contrast, FIGS.

15A-15F illustrates the results that methods 1200 and 1300 may produce for a different candidate support region 1500. Candidate support region may include a plurality of sensor data points 1502, a center 1504, and corners 1506-1512. Specifically, the area of the convex hull 1514 may be smaller than the area of convex hull 1414. As illustrated in FIGS. 15B-15F, this may be due to non-planar regions, obstacles, or other topological irregularities present in the lower portion (proximate the side defined by corners 1510 and 1512) of candidate support region 1500. It may be noted that distances 1520 and 1522 are considerably shorter than distances 1516 and 1518. The four distances 1516, 1518, 1520, and 1522 may be processed to determine the SRS via any of the methods described above.

Additionally, some embodiments may have a support member smaller in size than a candidate support region (e.g. the area of a robotic foot may be smaller than the area of a candidate support region). Such embodiments may additionally utilize the four determined distances in order to decide which portions of a particular candidate support region offer the greatest extent of support. For example, a robotic device may determine that the upper right quadrant of candidate support region 1500 is the preferred portion of candidate support region 1500 in or on which to place the support member.

In addition to the exemplary methods described thus far, the SRS can additionally be based on other properties of a given candidate support region. It may be determined that a particular support region does not offer sufficient diagonal support by determining that an estimated incline of the particular region is greater than a first threshold value and/or the area of the inclined portion of the region is below a second threshold value. Example robotic devices may be likely to lose balance and or/fall over when a support member of the robotic device is placed in a region having an incline greater than, for example, 30 degrees in any one direction. For example, it may be determined that support region 600 of FIGS. 6A-6C has two planar surfaces that may appear to be obstacle free. However, the incline of the planar surfaces may be too high (higher than a threshold value) to properly support a support member of a robot. Similarly, it may be determined that support region 514 of FIG. 5C also contains two planar surfaces, one corresponding to the overhang 516 and one corresponding to the lower portion of support region 514 shown supporting foot 502. The methods described herein may recognize that overhang 516 and the corresponding determined plane constitute an obstacle to the foot 502. The SRS may be adjusted accordingly.

Figures 16A, 16B:
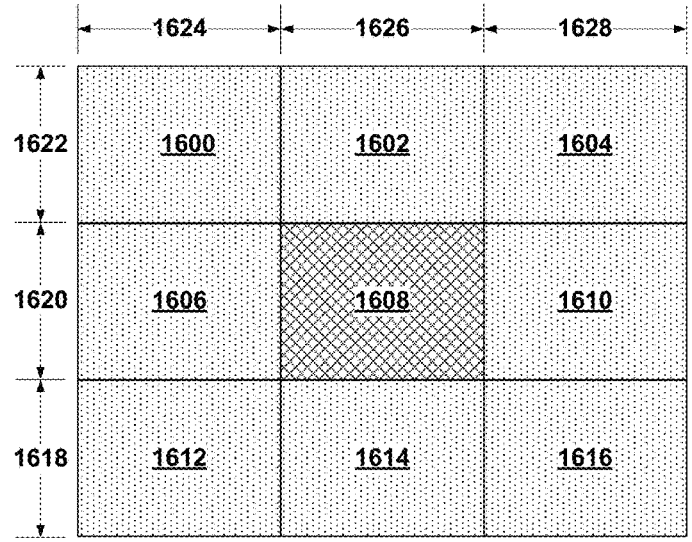
FIGS. 16A-16B illustrate aspects of a process of computing an adjacent relation score for a candidate support region, according to an example embodiment.

In addition to or instead of adjusting the SRS directly, the methods described herein may also handle terrain irregularities by using the adjacent relation score. An example implementation of an ARS computation method is illustrated in FIGS. 16A and 16B. The ARS for a particular candidate support region 1608 may be based on the properties of any combination of surrounding regions (adjacent regions) 1600, 1602, 1604, 1606, 1610, 1612, 1614, and 1616. For example, one embodiment may consider all of the surrounding regions 1600, 1602, 1604, 1606, 1610, 1612, 1614, and 1616 while another may only consider regions 1602, 1606, 1610, and 1614 in order to decrease the amount of computation required. The adjacent regions 1600, 1602, 1604, 1606, 1610, 1612, 1614, and 1616 may be other candidate support regions or they may be portions of other candidate support regions. For example, all the depicted regions may be candidate support regions having heights 1618, 1620, and 1622 equal to 5 cm and widths 1624, 1626, and 1628 equal to 5 cm. In another embodiment, region 1608 may be a candidate support region having a height 1620 of 5 cm and a width 1626 of 5 cm. Regions 1600, 1602, 1604, 1606, 1610, 1612, 1614, and 1616 may be portions of other candidate support regions, with heights 1618 and 1622 equal to 3 cm and widths 1624 and 1628 equal to 3 cm.

A SRS may be computed for each of the adjacent regions 1600, 1602, 1604, 1606, 1610, 1612, 1614. In the case where the adjacent regions are other candidate support regions, the SRS may already be available or may be determined in parallel with the ARS. When the adjacent regions represent only a portion of other candidate support regions (as opposed to entire candidate support regions), some embodiments may recompute a SRS for the portion of the entire candidate support region represented by the adjacent region while others may utilize the SRS already determined for the candidate support region of which the adjacent region is a subset.

In one embodiment, the ARS of candidate support region may be based only on the SRS scores 1640 of the group 1630 of adjacent regions 1600, 1602, 1604, 1606, 1610, 1612, 1614. Other embodiments may also determine a combination of a pitch angle 1632, a roll angle 1634, a maximum height 1636, and a minimum height 1638 of planes found within each of the support regions 1600-1616. The ARS may additionally or instead be based on these properties of the adjacent support regions. For example, it may be determined that the pitch angle 1632 of region 1608 (18 degrees) is too large and may result in the support member slipping if placed on that particular support region due to inaccuracies or uncertainties in the robot's motion. As each candidate support region may contain multiple planes, the pitch angle and roll angle may be computed as the average, the minimum, or the maximum of the pitch angles and roll angles of individual planes. The minimum and maximum heights may be determined based on the lowest and highest planes respectively found in a given candidate support region.

In computing the ARS of region 1608, a particular embodiment may, for each adjacent region, determine a difference between the pitch angle of region 1608 and a given adjacent region, determine a difference between the roll angle of region 1608 and the given adjacent region, and determine the maximum height difference between region 1608 and the given adjacent region. An ARS sub-score may be computed for each of the adjacent regions. The ARS sub-scores may then be combined into an overall ARS score for region 1608. For example, the ARS sub-scores may be of the form $ARS_{SUBSCORE} = SRS_{ADJACENT}(w_1 \Delta_{PITCH} + w_2 \Delta_{ROLL} + w_3 \Delta_{HEIGHT})$ where $w_1$, $w_2$, and $w_3$ may be a design choice used to determine the respective weights (respective importance) of the corresponding multiplicand, $\Delta_{PITCH}$ is the difference between the pitch angle of candidate support region 1608 and a respective adjacent region, $\Delta_{ROLL}$ is the difference between the roll angle of candidate support region 1608 and the respective adjacent region, $\Delta_{HEIGHT}$ is the maximum difference in height between the candidate support region 1608 and the respective adjacent region, and $SRS_{ADJACENT}$ is the SRS of the respective adjacent region.

Alternatively, the ARS of region 1608 may be computed by first determining the largest difference in each of the parameters 1632, 1634, 1636, and 1638 between the candidate support region 1608 and all of the adjacent regions. For example, the largest pitch angle difference $MAX(\Delta_{PITCH})$ of 14 degrees exists between candidate support region 1608 and adjacent region 1610, the largest roll angle difference $MAX(\Delta_{ROLL})$ of 13 degrees exists between candidate support region 1608 and adjacent region 1602, and the largest height difference $MAX(\Delta_{HEIGHT})$ of 13 cm exists between candidate support region 1608 and adjacent region 1610. The overall ARS may computed in a manner similar to that described above, namely ARS=AVERAGE(SRS$_{ADJACENT}$) ($w_1$MAX($\Delta_{PITCH}$)  $w_2$MAX($\Delta_{ROLL}$)+$w_3$MAX($\Delta_{HEIGHT}$)) where $w_1$, $w_2$, and $w_3$ may be a design choice used to determine the respective weights (respective importance) of the corresponding multiplicand and AVERAGE (SRS$_{ADJACENT}$) represents the average of the SRS of all the adjacent regions. Other variations of the actual computation are possible, and may achieve similar outcomes by utilizing at least one of the parameters described in FIG. 16B.

The aforementioned methods may additionally integrate with different methods of robot modeling, control, and path planning. For example, the methods described in the present disclosure may be utilized by a robot controlled using an inverted pendulum model, a Zero Moment Point (ZMP) model, or any number of other available control models. Furthermore, an exemplary robotic device may cache the results of SRS and ARS computations so as to avoid unnecessarily recomputing the scores for regions that have already been analyzed. The robotic device may compute new support region scores and adjacent relation scores or update existing support region scores and adjacent relation scores as new sensor data becomes available during locomotion.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining by one or more processors a plurality of candidate support regions for a support member of a robotic device based on sensor data received from one or more sensors;
   determining a plurality of support region scores corresponding to the plurality of candidate support regions by:
      determining at least one plane within a respective candidate support region based on the sensor data received from the one or more sensors;
      determining at least one convex hull corresponding to each of the at least one plane within the respective candidate support region; and
      based on the at least one convex hull, determining the support region score for the respective candidate support region, wherein the support region score for a given candidate support region depends on a surface geometry of the given candidate support region;
   determining a plurality of adjacent relation scores corresponding to the plurality of candidate support regions, wherein the adjacent relation score for a particular candidate support region is based at least on a plurality of support region scores of a plurality of support regions surrounding the particular candidate support region;
   based on the determined plurality of support region scores and the determined plurality of adjacent relation scores, selecting at least one support region for the support member of the robotic device from the plurality of candidate support regions; and
   providing instructions for the robotic device to place the support member on the at least one selected support region.

2. The method of claim 1, wherein the candidate support regions are determined to be rectangular and wherein determining the support region score for the respective candidate support region based on the at least one convex hull comprises:

determining whether a respective convex hull encloses the center of the respective candidate support region; and
    when the respective convex hull encloses the center of the respective candidate support region, determining a ratio of an area enclosed by the respective convex hull to a total area of the respective candidate support region.

3. The method of claim 1, wherein the candidate support regions are determined to be rectangular, the method further comprising:

for each of the at least one convex hull and for each of the four corners of the respective candidate support region, determining a distance between the center of the respective candidate support region and a point of intersection between a respective convex hull corresponding to a respective plane within the respective candidate support region and a line extending from the center of the respective candidate support region to the corner of the respective candidate support region; and
    determining the support region score for the respective candidate support region further based on the four determined distances for each of the at least one convex hull.

4. The method of claim 3, wherein determining the support region score for the respective candidate support region further based on the four determined distances of each of the at least one convex hull comprises determining at least one of (1) an average of the four determined distances, (2) a minimum of the four determined distances, (3) a maximum of the four determined distances, and (4) a weighted linear combination of the four determined distances.

5. The method of claim 1, further comprising determining a pitch angle and a roll angle for each of the plurality of candidate support regions, wherein the adjacent relation score for a respective candidate support region is further based on:

a pitch angle difference between the respective candidate support region and at least a portion of at least one other candidate support region near the respective candidate support region; and
    a roll angle difference between the respective candidate support region and at least a portion of at least one other candidate support region near the respective candidate support region.

6. The method of claim 1, wherein the adjacent relation score for a respective candidate support region is further based on a maximum height difference between the respective candidate support region and at least a portion of at least one other candidate support region near the respective candidate support region.

7. The method of claim 1, wherein determining the plurality of support region scores corresponding to the plurality of candidate support regions further comprises determining an extent of diagonal support for the support member of the robotic device present in each of the plurality of candidate support regions.

8. The method of claim 1, wherein determining the plurality of support region scores corresponding to the plurality of candidate support regions further comprises determining whether one or more obstacles are present above each of the plurality of candidate support regions.

9. The method of claim 1, wherein the sensor data received from the one or more sensors represents a 3D point cloud of the plurality of candidate support regions and wherein determining the plurality of support region scores corresponding to the plurality of candidate support regions comprises determining a number of data points present within a portion of the 3D point cloud that is representative of a respective candidate support region.

10. The method of claim 1, wherein the support member of the robotic device is a foot having a flat sole.

11. The method of claim 10, wherein the plurality of candidate support regions for the support member of the robotic device have a same size and shape as the foot having the flat sole.

12. The method of claim 10, wherein each of the plurality of candidate support regions for the support member of the robotic device has an area smaller than an area of the flat sole and wherein a group of neighboring support regions is selected for the support member of the robotic device from the plurality of candidate support regions based on the determined plurality of support region scores and the determined plurality of adjacent relation scores, wherein the group of support regions has a total area at least as large as the area of the flat sole.

13. The method of claim 1, wherein the plurality of candidate support regions for the support member of the robotic device represent a rigid terrain.

14. The method of claim 1, wherein at least a portion of the support region scores and at least a portion of the adjacent relation scores are cached between subsequent computations of the support regions scores and the adjacent relation scores for the plurality of support regions.

15. The method of claim 1, wherein the one or more sensors comprise at least one triangulation depth sensor.

16. The method of claim 1, wherein the at least one support region for the support member of the robotic device is selected from the plurality of candidate support regions based on determining that a support region score for the at least one support region is above a first threshold and that an adjacent relation score for the at least one support region is above a second threshold.

17. A robotic device, comprising:

a plurality of support members;
    at least one sensor on the robotic device; and
    a control system configured to:
        determine a plurality of candidate support regions for at least one of the plurality of support members based on sensor data received from the at least one sensor;
        determine a plurality of support region scores corresponding to the plurality of candidate support regions, wherein the support region score for a given candidate support region depends on a surface geometry of the given candidate support region;
        determine a plurality of adjacent relation scores corresponding to the plurality of candidate support regions, wherein the adjacent relation score for a particular candidate support region is based at least on a plurality of support region scores of a plurality of support regions surrounding the particular candidate support region;
        based on the determined plurality of support region scores and the determined plurality of adjacent relation scores, select at least one support region for the at least one of the plurality of support members from the plurality of candidate support regions; and provide instructions for the robotic device to place the at least one of the plurality of support members on the at least one selected support region.

18. The system of claim 17, wherein the control system is configured to determine the plurality of support region scores corresponding to the plurality of candidate support regions by:
   determining at least one plane within a respective candidate support region based on the sensor data received from the at least one sensor;
   determining at least one convex hull corresponding to each of the at least one plane within the respective candidate support region; and
   based on the at least one convex hull, determining the support region score for the respective candidate support region.

19. A non-transitory computer readable medium having stored thereon instructions that, when executed by a computing system, cause the computing system to perform functions comprising:
   determining a plurality of candidate support regions for a support member of a robotic device based on sensor data received from one or more sensors;
   determining a plurality of support region scores corresponding to the plurality of candidate support regions, wherein the support region score for a given candidate support region depends on a surface geometry of the given candidate support region;
   determining a pitch angle and a roll angle for each of the plurality of candidate support regions;
   determining a plurality of adjacent relation scores corresponding to the plurality of candidate support regions, wherein the adjacent relation score for a particular candidate support region is based at least on:
      a plurality of support region scores of a plurality of support regions surrounding the particular candidate support region;
      a pitch angle difference between the particular candidate support and at least a portion of at least one other candidate support region near the respective candidate support region; and
      a roll angle difference between the respective candidate support region and at least a portion of at least one other candidate support region near the respective candidate support region;
   based on the determined plurality of support region scores and the determined plurality of adjacent relation scores, selecting at least one support region for the support member of the robotic device from the plurality of candidate support regions; and
   providing instructions for the robotic device to place the support member on the at least one selected support region.

* * * * *